(12) United States Patent
Song

(10) Patent No.: US 11,146,117 B2
(45) Date of Patent: Oct. 12, 2021

(54) WIRELESS POWER TRANSMISSION APPARATUS FOR WIRELESS CHARGING

(71) Applicant: LG INNOTEK CO., LTD., Seoul (KR)

(72) Inventor: Il Jong Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 20 days.

(21) Appl. No.: 16/606,406

(22) PCT Filed: Apr. 17, 2018

(86) PCT No.: PCT/KR2018/004418
§ 371 (c)(1),
(2) Date: Oct. 18, 2019

(87) PCT Pub. No.: WO2018/194337
PCT Pub. Date: Oct. 25, 2018

(65) Prior Publication Data
US 2020/0127501 A1 Apr. 23, 2020

(30) Foreign Application Priority Data

Apr. 19, 2017 (KR) .................. 10-2017-0050348

(51) Int. Cl.
*H02J 50/40* (2016.01)
*H02M 7/46* (2006.01)
(Continued)

(52) U.S. Cl.
CPC .............. *H02J 50/40* (2016.02); *H02J 50/12* (2016.02); *H02J 50/80* (2016.02); *H02M 7/46* (2013.01)

(58) Field of Classification Search
CPC .... H02M 2001/007; H02M 7/48; H02M 7/90; H02M 7/46; H02J 50/70; H02J 7/02;
(Continued)

(56) References Cited

U.S. PATENT DOCUMENTS

2012/0242276 A1 9/2012 Jung et al.
2013/0278075 A1* 10/2013 Kurs ...................... H02J 7/025
307/104
(Continued)

FOREIGN PATENT DOCUMENTS

JP 2013-17336 A 1/2013
JP 2016-226241 A 12/2016
(Continued)

*Primary Examiner* — Toan T Vu
*Assistant Examiner* — Elim Ortiz
(74) *Attorney, Agent, or Firm* — Birch, Stewart, Kolasch & Birch, LLP

(57) ABSTRACT

A wireless power transmission apparatus for wirelessly transmitting power to a wireless power reception apparatus according to one embodiment of the present invention may comprise: a first transmission coil; a second transmission coil for transmitting power higher than power transmitted by the first transmission coil; a direct current power conversion unit for receiving direct current power applied thereto and outputting a first voltage and a second voltage higher than the first voltage; and a control unit for selecting one of the first and second voltages on the basis of an operating mode of the wireless power transmission apparatus and required power of the wireless power reception apparatus, and controlling such that power is transmitted through the first or second transmission coil, using the selected voltage.

12 Claims, 22 Drawing Sheets

(51) Int. Cl.
*H02J 50/12* (2016.01)
*H02J 50/80* (2016.01)

(58) Field of Classification Search
CPC .......... H02J 50/402; H02J 50/12; H02J 50/80; H02J 50/40; H01Q 7/00
See application file for complete search history.

(56) References Cited

U.S. PATENT DOCUMENTS

| | | | |
|---|---|---|---|
| 2014/0009109 A1* | 1/2014 | Lee .................. | H02J 50/80 320/108 |
| 2014/0125287 A1 | 5/2014 | Nakano et al. | |
| 2016/0241086 A1 | 8/2016 | Jung et al. | |
| 2017/0237296 A1* | 8/2017 | Keith .................. | H02J 50/80 307/104 |

FOREIGN PATENT DOCUMENTS

| | | |
|---|---|---|
| KR | 10-2011-0133856 A | 12/2011 |
| KR | 10-2012-0109067 A | 10/2012 |
| KR | 10-2015-0059069 A | 5/2015 |
| KR | 10-2015-0098575 A | 8/2015 |
| KR | 10-2016-0026556 A | 3/2016 |
| KR | 10-2017-0005589 A | 1/2017 |

* cited by examiner

FIG. 10

| Header | Packet type | Message Size (byte) |
|---|---|---|
| 0x01 | Signal Strength | 1 |
| 0x02 | End Power Transfer | 1 |
| 0x06 | Power Control Hold-off | 1 |
| 0x51 | Configuration | 5 |
| 0x71 | Identification | 7 |
| 0x81 | Extended Identification | 8 |
| 0x07 | General Request | 1 |
| 0x20 | Specific Request | 2 |
| 0x22 | FOD Status | 2 |
| 0x03 | Control Error | 1 |
| 0x09 | Renegotiate | 1 |
| 0x31 | 24-bit Received Power | 3 |
| 0x04 | 8-bit Received Power | 1 |
| 0x05 | Charge Status | 1 |

WIRELESS POWER TRANSMISSION APPARATUS FOR WIRELESS CHARGING

TECHNICAL FIELD

Embodiments relate to wireless power transmission technology, and more particularly, to a wireless power transmission apparatus for wireless charging.

BACKGROUND ART

Recently, with rapid development of information and communication technology, a society based on ubiquitous information and communication technology has been formed.

In order to connect information and communication apparatuses anywhere and anytime, sensors each having a computer chip having a communication function need to be installed in all social facilities. Accordingly, problems related to supply of power to such apparatuses or sensors have newly arisen. In addition, as portable apparatuses such as mobile phones, Bluetooth handsets and music players such as iPod have rapidly increased, it takes time and effort for a user to charge batteries. As a method for solving such a problem, recently, wireless power transmission technology is attracting considerable attention.

Wireless power transmission or wireless energy transfer technology refers to technology of wirelessly transmitting electric energy from a transmitter to a receiver using the principle of magnetic induction. In the 1800 s, electrical motors or transformers using the principle of electromagnetic induction already started to be used and then methods of radiating radio waves or electromagnetic waves such as lasers and transmitting electric energy were also attempted. Commonly used electric toothbrushes or electric razors are charged using the principle of electromagnetic induction.

Up to now, a wireless energy transfer method may be roughly divided into a magnetic induction method, an electromagnetic resonant method and a power transmission method using a short-wavelength radio frequency.

The magnetic induction method refers to technology of using a phenomenon that, when two coils are adjacently placed and current is supplied to one coil, a magnetic flux is generated to generate electromotive force in the other coil, and is commercially available in small apparatuses such as mobile phones. The magnetic induction method may transmit power of a maximum of several kilowatts (kW) and has high efficiency. However, since a maximum transmission distance is 1 cm or less, an apparatus should be generally located to be adjacent to a charger.

The magnetic induction method uses an electric field or a magnetic field instead of electromagnetic waves or current. The magnetic induction method is hardly influenced by an electromagnetic wave and thus is harmless to other electronic apparatuses and humans. In contrast, the magnetic induction method may be used at a limited distance and in a limited space and energy transfer efficiency is slightly low.

The short-wavelength wireless power transmission method—briefly referred to as an RF method—uses a method of directly transmitting and receiving energy in the form of radio waves. This technology is an RF type wireless power transmission method using a rectenna. Rectenna means is a compound word of "antenna" and "rectifier" and means an element for directly converting RF power into direct current (DC) power. That is, the RF method is technology of converting AC radio waves into DC radio waves and using DC radio waves and, recently, research into commercialization thereof has been actively conducted as efficiency is improved.

Wireless power transmission technology may be variously used in IT, railroad and consumer-electronics in addition to the mobile industry.

A wireless charging function is installed in various devices, and the intensity of power required by a wireless power reception apparatus is diversified. In order to use a wireless power transmission apparatus in a home, there is a need for an adapter for converting commercial power to direct current (DC) power corresponding to a specific voltage. In general, a voltage output by the adaptor is fixed to a specific voltage, and thus a wireless power transmission apparatus needs to include a high-power coil for transmitting relatively high power or to include a low-power coil for transmitting relatively low power.

However, as a type of a device having a wireless charging function is diversified, there is a need for a wireless power transmission apparatus for supporting both a wireless power reception apparatus that requires high power and a wireless power reception apparatus that requires low power.

DISCLOSURE

Technical Problem

Embodiments provide a wireless power transmission apparatus for wireless charging.

Further, embodiments provide a wireless power transmission apparatus for supporting both wireless power reception apparatuses that require high power and low power.

It is to be understood that both the foregoing general description and the following detailed description of the present disclosure are exemplary and explanatory and are intended to provide further explanation of the present disclosure as claimed.

Technical Solution

In one embodiment, a wireless power transmission apparatus includes a first transmission coil, a second transmission coil configured to transmit higher power than the first transmission coil, a direct current (DC) power converter configured to receive DC power and to output a first voltage and a second voltage higher than the first voltage, and a controller configured to select any one of the first and second voltages based on an operation mode and required power of a wireless power reception apparatus and to perform control to transmit power through the first transmission coil or the second transmission coil using the selected voltage.

In some embodiments, the wireless power transmission apparatus may further include an inverter operated as a half bridge inverter or a full bridge inverter, wherein the controller may determine whether the inverter is operated as a half bridge inverter or a full bridge inverter based on the operation mode and the required power.

In some embodiments, when the operation mode is a quality measurement mode, the controller may select the first voltage and may perform control to supply the first voltage to a quality measurement circuit for generating a quality factor value and to operate the inverter as a half bridge inverter irrespective of required power of the wireless power reception apparatus.

In some embodiments, when the operation mode is a ping mode, the controller may select the first voltage and may perform control to supply the first voltage to the inverter and to operate the inverter as a half bridge inverter irrespective of required power of the wireless power reception apparatus.

In some embodiments, the controller may perform control to alternately select the first transmission coil and the second transmission coil.

In some embodiments, when the operation mode is a power transmission mode, if the wireless power reception apparatus makes a request for first power or second power, the controller may select the first voltage, may perform control to supply the first voltage to the inverter, and may perform control to transmit power through the first transmission coil.

In some embodiments, when the wireless power reception apparatus makes a request for the first power, the controller may operate the inverter as a half bridge inverter, and when the wireless power reception apparatus makes a request for the second power, the controller may operate the inverter as a full bridge inverter.

In some embodiments, when the operation mode is a power transmission mode, if the wireless power reception apparatus makes a request for third power or fourth power, the controller may select the second voltage, may perform control to supply the second voltage to the inverter, and may perform control to transmit power through the second transmission coil.

In some embodiments, when the wireless power reception apparatus makes a request for the third power, the controller may operate the inverter as a half bridge inverter, and when the wireless power reception apparatus makes a request for the fourth power, the controller may operate the inverter as a full bridge inverter.

In some embodiments, an external circumference of the first transmission coil may be smaller than an internal circumference of the second transmission coil, and the first transmission coil and the second transmission coil may be concentrically arranged.

It is to be understood that both the foregoing general description and the following detailed description of the present disclosure are exemplary and explanatory and are intended to provide further explanation of present disclosure as claimed.

Advantageous Effects

A method, an apparatus, and a system according to embodiments may have the following effects.

A wireless power control apparatus according to an embodiment may generate direct current (DC) power of a low voltage for generating low power and a high voltage for generating high power using commercial alternating current (AC) power.

A plurality of transmission coils belonging to different categories may be installed in a single wireless power transmission apparatus to support a wireless power reception apparatus that makes a request for various types of power.

In addition, transmission power may be generated using a low voltage in a ping mode, a quality measurement mode, or the like, which do not make a request for relatively high transmission power, and thus power consumed in the wireless power transmission apparatus may be minimized.

It will be appreciated by persons skilled in the art that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

Arrangements and embodiments may be described in detail with reference to the following drawings in which like reference numerals refer to like elements and wherein:

FIG. 10 is a view illustrating the types of packets defined in the WPC (Qi) standard according to an embodiment;

BEST MODE

Figure 1:
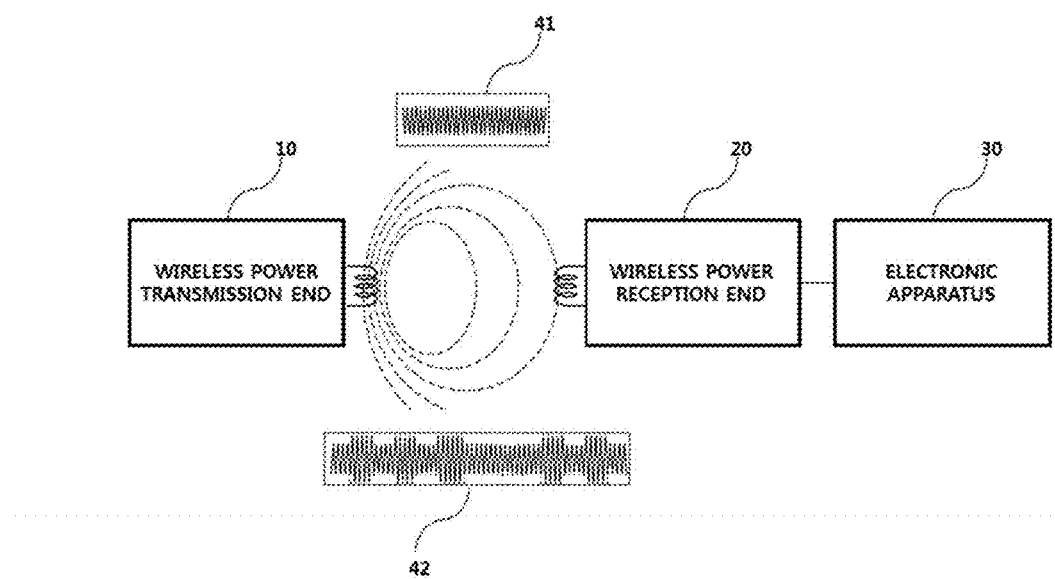
FIG. 1 is a block diagram for explanation of a wireless charging system according to an embodiment.

According to an embodiment, a wireless power transmission apparatus for wirelessly transmitting power to a wireless power reception apparatus includes a first transmission coil, a second transmission coil configured to transmit higher power than the first transmission coil, a direct current (DC) power converter configured to receive DC power and to output a first voltage and a second voltage higher than the first voltage, and a controller configured to select any one of the first and second voltages based on an operation mode and required power of a wireless power reception apparatus and to perform control to transmit power through the first transmission coil or the second transmission coil using the selected voltage.

MODE FOR INVENTION

Reference will now be made in detail to the preferred embodiments of the disclosure, examples of which are illustrated in the accompanying drawings. The suffixes "module" and "unit" of elements herein are used for convenience of description and thus may be used interchangeably and do not have any distinguishable meanings or functions.

In description of exemplary embodiments, it will be understood that, when an element is referred to as being "on" or "under" another element, the element can be directly on another element or intervening elements may be present. In addition, when an element is referred to as being "on" or "under" another element, this may include the meaning of an upward direction or a downward direction based on one component.

In the following description of the embodiments, for convenience of description, an apparatus for wirelessly transmitting power in a wireless power transmission system may be used interchangeably with a wireless power transmitter, a wireless power transmission apparatus, a transmission end, a transmitter, a transmission apparatus, a transmission side, etc. In addition, for convenience of description, an apparatus having a function of wirelessly receiving power from a wireless power transmission apparatus may be used interchangeably with a wireless power reception apparatus, a wireless power receiver, a reception terminal, a reception side, a reception apparatus, a receiver, etc.

A transmitter according to the disclosure may be configured in the form of a pad, a cradle, an access point (AP), a small base station, a stand, a ceiling insert type, a wall-hanging type, or the like, and one transmitter may simultaneously transmit power to a plurality of wireless power reception apparatuses. To this end, a transmitter may include at least one wireless power transmission element. Here, a wireless power transmission element may use various wireless power transmission standards based on an electromagnetic induction method of charging according to the electromagnetic induction principle that a magnetic field is generated from a coil of a power transmission end and electricity is induced from a coil of a reception end under the influence of the magnetic field. Here, the wireless power transmission element may include wireless charging technology of an electromagnetic induction method defined in wireless power consortium (WPC) and power matters alliance (PMA).

In addition, a wireless power receiver according to an embodiment may include at least one wireless power reception element and may wirelessly receive power from two or more transmitter. Here, the wireless power reception element may include wireless charging technology of the electromagnetic induction method defined in the Wireless Power Consortium (WPC) and Power Matters Alliance (PMA) which are the wireless charging technology organizations.

In addition, a receiver according to the disclosure may be mounted on a small-size electronic apparatus such as a mobile phone, a smartphone, a laptop, a digital broadcasting terminal, a personal digital assistants (PDA), a portable multimedia player (PMP), a navigation system, an MP3 player, an electric toothbrush, a radio frequency identification (RFID) tag, an illumination apparatus, a remote controller, a bobber, and a smart watch without being limited thereto. Accordingly, the receiver may be any device as long as the receiver includes the wireless power reception element according to the disclosure to charge a battery.

FIG. 1 is a block diagram for explanation of a wireless charging system according to an embodiment.

Referring to FIG. 1, the wireless charging system may broadly include a wireless power transmission end 10 configured to wirelessly transmit power, a wireless power reception end 20 configured to receive the transmission power, and an electronic device 30 configured to receive the received power.

For example, the wireless power transmission end 10 and the wireless power reception end 20 may perform in-band communication of exchanging information using the same frequency band as an operation frequency used in wireless power transmission. In another example, the wireless power transmission end 10 and the wireless power reception end 20 may also perform out-of-band communication of exchanging information using separate frequency bands different from an operation frequency used in wireless power transmission.

For example, information exchanged between the wireless power transmission end 10 and the wireless power reception end 20 may include control information as well as state information of each other. Here, the state information and the control information that are exchanged between transmission and reception ends will be obviously understood with reference to a description of the following embodiments.

The in-band communication and the out-of-band communication may provide bi-directional communication without being limited thereto. According to another embodiment, unidirectional communication or half-duplex communication may also be provided.

For example, in the unidirectional communication, the wireless power reception end 20 may transmit information only to the wireless power transmission end 10 without being limited thereto, and the wireless power transmission end 10 may also transmit information only to the wireless power reception end 20.

In the half-duplex communication, bi-directional communication may be enabled between the wireless power reception end 20 and the wireless power transmission end 10, but it may be possible to transmit information by only one device at any one time point.

The wireless power reception end 20 according to an embodiment may acquire various pieces of state information of the electronic device 30. For example, the state information of the electronic device 30 may include current power usage information, information for identifying executed application, CPU usage information, battery charging state information, battery output voltage/current information, and the like, without being limited thereto, and may include any information that is capable of being acquired from the electronic device 30 and being used in wireless power control.

In particular, the wireless power transmission end 10 according to an embodiment may transmit a predetermined packet indicating whether high-speed charging is supported, to the wireless power reception end 20. The wireless power reception end 20 may inform the electronic apparatus 30 that the wireless power transfer end 10 supports the fast charging mode, upon determining that the wireless power transfer end 10 supports the fast charging mode. The electronic apparatus 30 may display information indicating that fast charging is possible through a predetermined display means, for example, a liquid crystal display.

In addition, the user of the electronic apparatus 30 may select a predetermined fast charging request button displayed on the liquid crystal display means and control the wireless power transmission end 10 to operate in the fast charging mode. In this case, when the user selects the fast charging request button, the electronic apparatus 30 may transmit a predetermined fast charging request signal to the wireless power reception end 20. The wireless power reception end 20 may generate and transmit a charging mode packet corresponding to the received fast charging request signal to the wireless power transmission end 10, thereby switching a commercial low-power charging mode to the fast charging mode.

Figure 2:
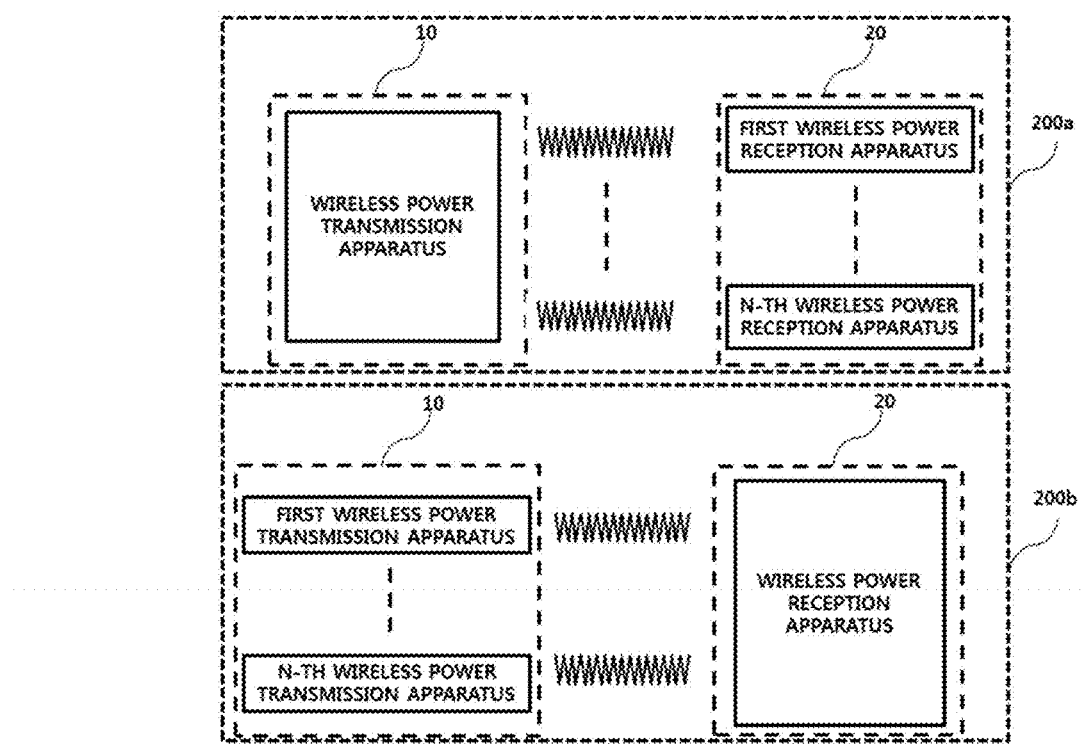
FIG. 2 is a block diagram for explanation of a wireless charging system according to another embodiment.

FIG. 2 is a block diagram for explanation of a wireless charging system according to another embodiment.

For example, as shown in a reference numeral 200a, the wireless power reception end 20 may include a plurality of wireless power reception apparatuses, and the plurality of wireless power reception apparatuses may be connected to one wireless power transmission end 10 to perform wireless charging. In this case, the wireless power transmission end may distribute and transmit power to the plurality of wireless power reception apparatuses using a time-division method without being limited thereto, and in another example, the wireless power transmission end 10 may distribute and transmit power to a plurality of wireless power reception apparatuses using different frequency bands allocated to respective wireless power reception apparatuses.

In this case, the number of wireless power reception apparatuses connectable to one wireless power transmission end may be adaptively determined based on at least one of requested electric energy for respective wireless power reception apparatuses, a battery charging state, power consumption of an electronic device, or available electric energy of a wireless power transmission apparatus.

In another example, as shown in a reference numeral 200b, the wireless power transmission end 10 may include a plurality of wireless power transmission apparatuses. In this case, the wireless power reception end 20 may be simultaneously be connected to the plurality of wireless power transmission apparatuses, and may simultaneously receive power from the connected wireless power transmission apparatuses to perform charging. In this case, the number of wireless power transmission apparatuses connected to the wireless power reception end 20 may be adaptively determined based on requested electric energy of the wireless power reception end 20, a battery charging state, power consumption of an electronic device, available electric energy of a wireless power transmission device, and the like.

Figure 3:
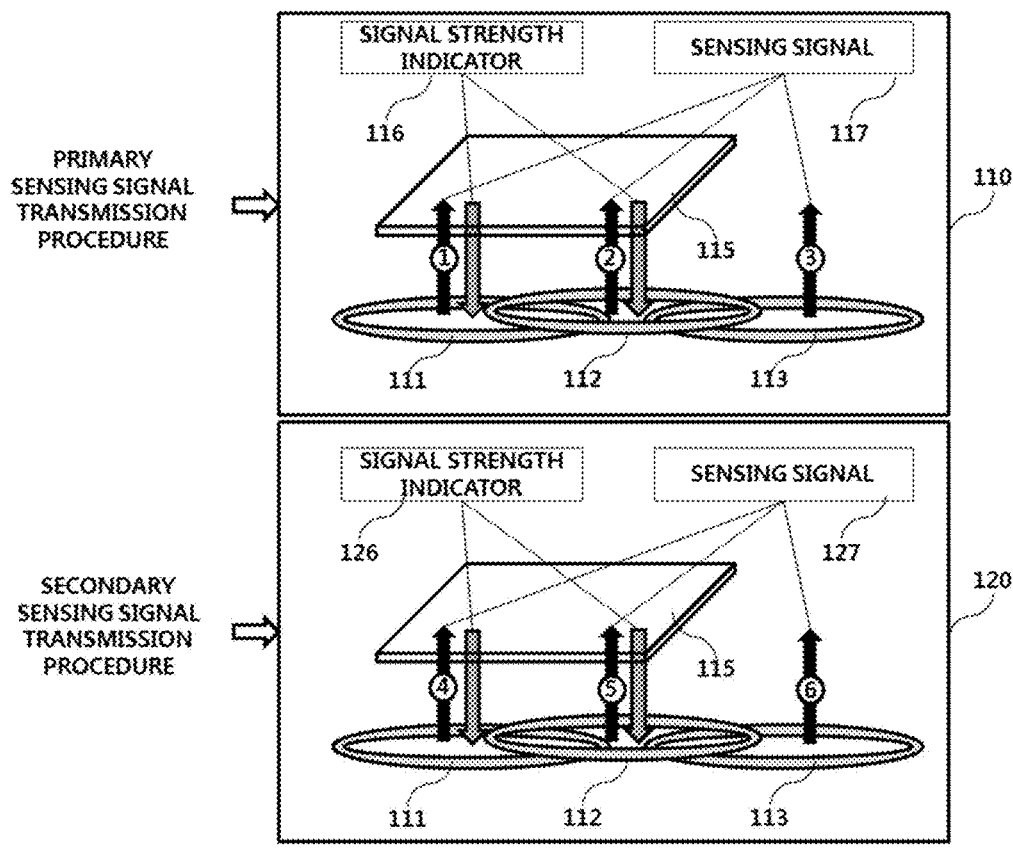
FIG. 3 is a diagram for explanation of a produce of transmitting a detection signal in a wireless charging system according to an embodiment.

FIG. 3 is a diagram for explanation of a procedure of transmitting a detection signal in a wireless charging system according to an embodiment.

For example, three transmission coils 111, 112, and 113 may be installed in a wireless power transmitter. A partial region of each transmission coil may overlap another transmission coil, and a wireless power transmitter may sequentially transmit predetermined detection signals 117 and 127—for example, a digital ping signal—for detection of presence of a wireless power receiver through each transmission coil in a predefined order.

As shown in FIG. 3, the wireless power transmitter may sequentially transmit the detection signal 117 through a primary detection signal transmission procedure indicated by a reference numeral 110 and may identify the transmission coils 111 and 112 through which a signal strength indicator 116 is received from a wireless power receiver 115. Then, the wireless power transmitter may sequentially transmit the detection signal 127 through a secondary detection signal transmission procedure indicated by a reference numeral 120, may identify a transmission coil with high power transmission efficiency (or transmission efficiency)—that is, an alignment state between a transmission coil and a reception coil—among the transmission coils 111 and 112 through which a signal strength indicator 126 is received, and may perform control to transmit power—that is, to perform wireless charging—through the identified transmission coil.

As shown in FIG. 3, the wireless power transmitter performs the detection signal transmission procedure twice in order to more accurately identify whether reception coils of the wireless power receiver are appropriately aligned in a transmission coil.

As shown in reference numerals 110 and 120 of FIG. 3, when a first transmission coil 111 and a second transmission coil 112 receive the signal strength indicators 116 and 126, the wireless power transmitter may select a transmission coil that is the most appropriately aligned based on the signal strength indicator 126 received by each of the first transmission coil 111 and the second transmission coil 112 and may perform wireless charging using the selected transmission coil.

Figure 4:
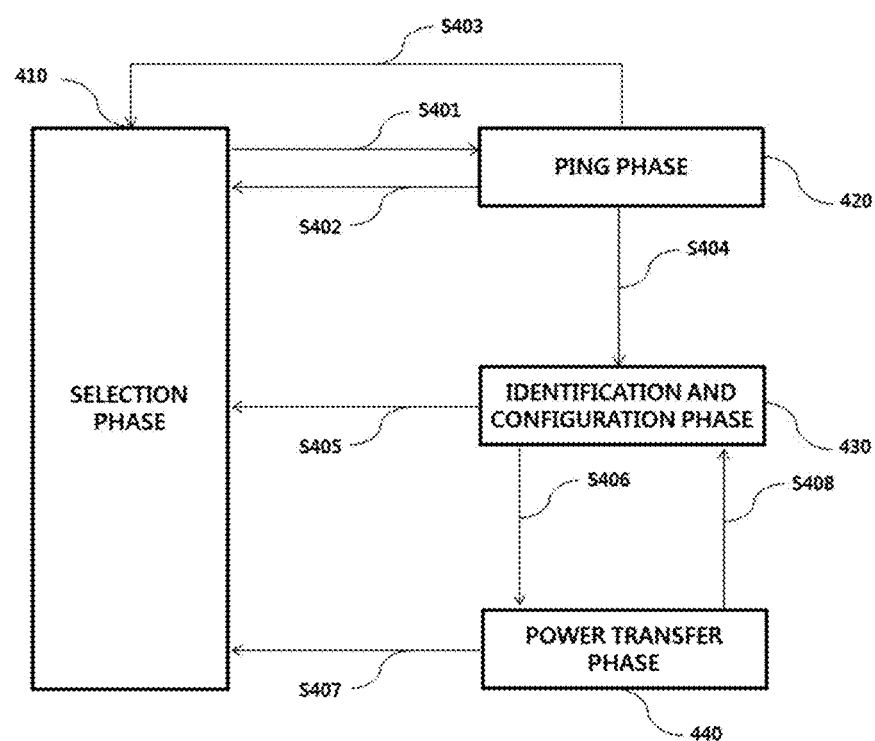
FIG. 4 is a state transition diagram explaining a wireless power transfer procedure defined in the WPC standard.

FIG. 4 is a state transition diagram for explanation of a wireless power transmission procedure defined in the wireless power consortium (WPC) standard.

Referring to FIG. 4, power transmission to a receiver from a transmitter according to the WPC standard may be broadly classified into a selection phase 410, a ping phase 420, an identification and configuration phase 430, and a power transfer phase 440.

The selection phase 410 may be a phase that transitions when a specific error or a specific event is detected while power transmissions is started or power transmission is maintained. Here, the specific error and the specific event would be obvious from the following description. In addition, in the selection phase 410, the transmitter may monitor whether an object is present on an interface surface. Upon detecting that the object is present on the interface surface, the transmitter may transition to the ping phase 420 (S401). In the selection phase 410, the transmitter may transmit an analog ping signal with a very short pulse and may detect whether an object is present in an activate area of the interface surface—i.e., a chargeable area—based on a current change of a transmission coil.

In the ping phase 420, upon detecting the object, the transmitter may activate—i.e., boot—the receiver and may transmit a digital ping for identifying whether the receiver is compatible with the WPC standard. In the ping phase 420, the transmitter does not receive a response signal to the digital ping, e.g., a signal strength indicator from the receiver, the ping phase 420 may re-transition to the selection phase 410 (S402). In the ping phase 420, upon receiving a signal indicating that power transmission is completed, i.e., an end of power signal, from the receiver, the transmitter may transition to the selection phase 410 (S403).

When the ping phase 420 is completed, the transmitter may transition to the identification and configuration phase 430 for collecting receiver identification and receiver configuration and state information (S404).

In the identification and configuration phase 430, when the transmitter receives an unexpected packet or does not receive an expected packet for a predefined time period (time out), there is packet transmission error, or power transfer contract is not set, the transmitter may transition to the selection phase 410 (S405).

When identification and configuration of the receiver are completed, the transmitter may transition to the power transfer phase 440 for wirelessly transmitting power (S406).

In the power transfer phase 440, when the transmitter receives an unexpected packet or does not receive an expected packet for a predefined time period (time out), preset power transfer contract violation occurs, or charging is completed, the transmitter may transition to the selection phase 410 (S407).

In the power transfer phase 440, when power transfer contract needs to be re-configured depending on a state change in the transmitter, the transmitter may transition to the identification and configuration phase 430 (S408).

The power transfer contract may be set based on state and characteristics information of the transmitter and the receiver. For example, the state information of the transmitter may include information on a maximum transmissible power amount, information on the number of maximum acceptable receivers, and so on and the state information of the receiver may include information on required power, and so on.

Figure 5:
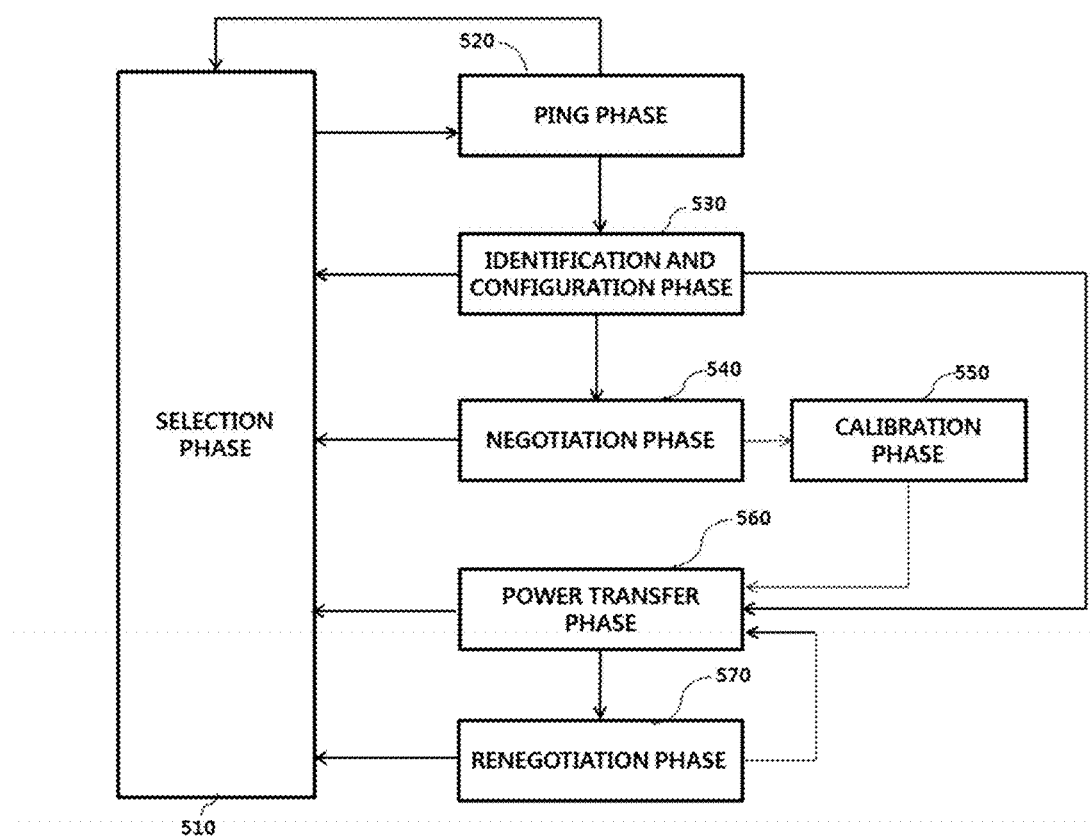
FIG. 5 is a state transition diagram explaining a wireless power transfer procedure defined in the WPC (Qi) standard.

FIG. 5 is a state transition diagram explaining a wireless power transfer procedure defined in the WPC (Qi) standard.

Referring to FIG. 5, power transfer from the transmitter to the receiver according to the WPC (Qi) standard may be roughly divided into a selection phase 510, a ping phase, 520, an identification and configuration phase 530, a negotiation phase 540, a calibration phase 550, a power transfer phase 560 and a renegotiation phase 570.

The selection phase 510 may transition when power transfer starts or when a specific error or a specific event is sensed while power transfer is maintained. The specific error and the specific event will become apparent from the following description. In addition, in the selection phase 510, the transmitter may monitor whether an object is present on an interface surface. When it is sensed that the object is present on the interface surface, the transmitter may transition to the ping phase 520. In the selection phase 510, the transmitter transmits an analog ping signal having a very short pulse and senses whether an object is present in an active area of the interface surface based on change in current of a transmission coil or a primary coil.

In the ping phase 520, when the object is sensed, the transmitter activates the receiver and transmits a digital ping for identifying whether the receiver is compatible with the WPC standard. In the ping phase 520, when a response signal to the digital ping, for example, a signal strength packet, is not received from the receiver, the transmitter may transition to the selection phase 510 again. In addition, in the ping phase 520, when a signal indicating that power transfer has been terminated, that is, a charging termination packet, is received from the receiver, the transmitter may transition to the selection phase 510.

If the ping phase 520 is finished, the transmitter may transition to the identification and configuration phase 530 for identifying the receiver and collecting the configuration and status information of the receiver.

In the identification and configuration phase 530, when an unexpected packet is received, when an expected packet is not received during a predetermined time (timeout), when a packet transmission error occurs, or when power transfer contract is not established (no power transfer contract), the transmitter may transition to the selection phase 510.

The transmitter may determine whether entry into the negotiation phase 540 is necessary based on the negotiation field value of the configuration packet received in the identification and configuration phase 530.

Upon determining that negotiation is necessary, the transmitter may transition to the negotiation phase 540 to perform a predetermined FOD procedure.

In contrast, upon determining that negotiation is not necessary, the transmitter may immediately transition to the power transfer phase 560.

In the negotiation phase 540, the transmitter may receive a foreign object detection (FOD) status packet including a reference quality factor value. At this time, the transmitter may determine a threshold value for FO detection based on the reference quality factor value.

The transmitter may detect whether the FO is present in the charging using the determined threshold value and the currently measured quality factor value and control power transfer according to the FO detection result.

For example, when the FO is detected, the transmitter may return to the selection phase 510. In contrast, when the FO is not detected, the transmitter may transition to the power transfer phase 560 through the calibration phase 550. Specifically, when the FO is not detected, the transmitter may measure power loss in the reception end and the transmission end, in order to determine the strength of the power received by the reception end and to determine the strength of the power transmitted by the transmission end in the calibration phase 550. That is, the transmitter may predict power loss based on a difference between the transmission power of the transmission end and the reception power of the reception end in the calibration phase 550. The transmitter according to one embodiment may calibrate the threshold value for FOD using the predicted power loss.

In the power transfer phase 560, when an unexpected packet is received, when an expected packet is not received during a predetermined time (timeout), when power transfer contract violation occurs or when charging is finished, the transmitter may transition to the selection phase 510.

In addition, in the power transfer phase 560, if power transfer contract needs to be reconfigured according to transmitter status change, etc., the transmitter may transition to the renegotiation phase 570. At this time, when renegotiation is normally finished, the transmitter may return to the power transfer phase 560.

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power.

Figure 6:
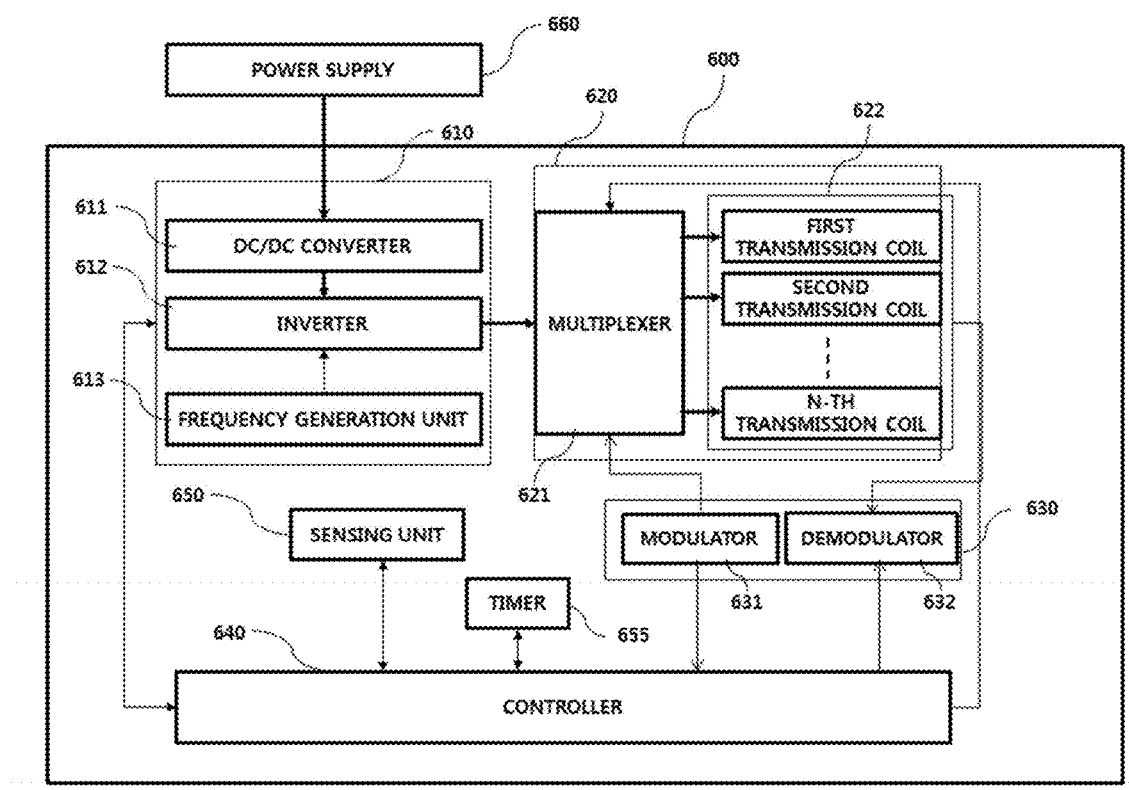
FIG. 6 is a block diagram illustrating the structure of a wireless power transmitter according to an embodiment.

FIG. 6 is a block diagram illustrating the structure of a wireless power transmitter according to an embodiment.

Referring to FIG. 6, the wireless power transmitter 600 may roughly include a power converter 610, a power transmission unit 620, a communication unit 630, a controller 640, and a sensing unit 650. The configuration of the wireless power transmitter 600 is not necessarily essential and thus more or fewer components may be included.

As shown in FIG. 6, upon receiving DC power from a power supply 660, the power converter 610 may convert the power to AC power having a predetermined strength.

To this end, the power converter 610 may include a DC/DC converter 611, an inverter 612, and a frequency generation unit 613. Here, the inverter 612 may be, but is not limited to, a half bridge inverter or a full bridge inverter, and may have any circuit structure for converting DC power to AC power having a specific operation frequency.

The DC/DC converter 611 may perform a function for converting DC power received from the power supply 660 to DC power having a specific strength according to a control signal of the controller 640.

At this time, the sensing unit 650 may measure and supply the voltage/current of the converted DC power to the controller 640. In addition, the sensing unit 650 may measure the internal temperature of the wireless power transmitter 600 and supply the measured result to the controller 640, in order to determine whether overheating occurs. For example, the controller 640 may adaptively cut off power supplied from the power supply 660 or prevent power from being supplied to the inverter 612 based on the voltage/current value measured by the sensing unit 650. To this end, a predetermined power cutoff circuit for cutting off power supplied from the power supply 660 or power supplied to the inverter 612 may be further provided at one side of the power converter 610.

The inverter 612 may the DC/DC converted DC power to AC power based on a reference AC signal generated by the frequency generation unit 613. In this case, a frequency of the reference AC signal—that is, an operation frequency— may be dynamically changed according to a control signal of the controller 640. The wireless power transmitter 600 according to an embodiment may also adjust the operation frequency and may adjust the intensity of transmission power. For example, the controller 640 may receive the power reception state information or(and) power control signal of the wireless power receiver through the communication unit 630, may determine the operation frequency based on the received power reception state information or(and) power control signal, and may dynamically control the frequency generation unit 613 to generate the determined operation frequency. For example, the power reception state information may include, but is not limited to, information on intensity of output voltage of a rectifier, information on intensity of current applied to a reception coil, or the like. The power control signal may include a signal for making a request for increase in power, a signal for making a request for reduction in power, or the like.

The power transmission unit 620 may include a multiplexer 621 and a transmission coil 622. Here, the transmission coil 622 may include first to n-th transmission coils. The power transmission unit 620 may further include a carrier wave generation device (not shown) for generating a specific carrier frequency for power transmission. In this case, the carrier wave generation device may generate a specific carrier frequency to be mixed with AC power output from the inverter 612, received through the multiplexer 621. According to an embodiment, it should be noted that frequencies of AC power transmitted to respective transmission coils are different from each other. According to another embodiment, resonance frequencies of respective transmission coils may be differently set using a specific frequency controller having a function of differently adjusting LC resonance properties.

The multiplexer 621 may perform a switch function for transmitting AC power to a transmission coil selected by the controller 640. The controller 640 may select a transmission coil to be used in power transmission to a corresponding wireless power receiver based on a signal intensity indicator received for each transmission coil.

When a plurality of wireless power receivers is connected, the controller 640 according to an embodiment may also transmit power via time-division multiplexing for each transmission coil. For example, in the wireless power transmitter 600, three wireless power receivers—that is, first to third wireless power receivers—are identified through three different transmission coils—that is, first to third transmission coils—, respectively, the controller 640 may control the multiplexer 621 to transmit AC power through only a specific transmission coil in a specific time slot. In this case, the amount of power transmitted to a corresponding wireless power receiver may be controlled depending on the length of a time slot allocated for each transmission coil, but this is merely exemplary, and in another example, the controller 640 may control the intensity of output DC power of the DC/DC converter 611 to control transmission power for each wireless power receiver during a time slot allocated for each transmission coil.

The controller 640 may control the multiplexer 621 such that a sensing signal is sequentially transmitted through the first to n-th transmission coils 622 during a primary sensing signal transmission procedure. At this time, the controller 640 may identify a time when the sensing signal will be transmitted using a timer 655 and control the multiplexer 621 to transmit the sensing signal through the corresponding transmission coil when the sensing signal transmission time arrives. For example, the timer 655 may transmit a specific event signal to the controller 640 at predetermined periods during the ping transmission phase, and the controller 640 may control the multiplexer 621 to transmit the digital ping through the corresponding transmission coil, when the corresponding event signal is sensed.

In addition, the controller 640 may receive a predetermined transmission coil identifier for identifying through which transmission coil a signal strength indicator has been received from a demodulator 632 during the primary sensing signal transmission procedure and the signal strength indicator received through the corresponding transmission coil. Subsequently, in a secondary sensing signal transmission procedure, the controller 640 may control the multiplexer 621 to transmit the sensing signal only through the transmission coil(s) through which the signal strength indicator is received during the primary sensing signal transmission procedure. In another example, if the signal strength indicator is received through the plurality of transmission coils during the primary sensing signal transmission procedure, the controller 640 may determine a transmission coil, through which a signal strength indicator having a largest value is received, as a transmission coil, through which the sensing signal will be first transmitted in the secondary sensing signal transmission procedure, and control the multiplexer 621 according to the result of determination.

The communication unit 630 may include at least one of a modulator 631 and the demodulator 632.

The modulator 631 may modulate the control signal generated by the controller 640 and transmit the modulated signal to the multiplexer 621. Here, the modulation method of modulating the control signal may include, but is not limited to, a frequency shift keying (FSK) modulation method, a Manchester coding modulation method, a phase shift keying (PSK) modulation method, a pulse width modulation method, a differential bi-phase modulation method, etc.

When the signal received through the transmission coil is sensed, the demodulator 632 may demodulate and transmit the sensing signal to the controller 640. Here, the demodulated signal may include, but is not limited to, a signal strength indicator, an error correction (EC) indicator for power control during wireless power transmission, an end of charge (EOC) indicator, an overvoltage/overcurrent indicator, etc. and may further include a variety of status information for identifying the status of the wireless power receiver.

In addition, the demodulator 632 may identify through which transmission coil the demodulated signal is received, and provide a predetermined transmission coil identifier corresponding to the identified transmission coil to the controller 640.

In addition, the demodulator 632 may demodulate the signal received through a transmission coil 623 and transmit the demodulated signal to the controller 640. For example, the demodulated signal may include, but is not limited to, a signal strength indicator and the demodulated signal may include a variety of status information of the wireless power receiver.

For example, the wireless power transmitter 600 may acquire the signal strength indicator through in-band communication for performing communication with the wireless power receiver using the same frequency as used for wireless power transmission.

In addition, the wireless power transmitter 600 may not only transmit wireless power through the transmission coil 622 but also exchange a variety of information with the wireless power receiver through the transmission coil 622. In another example, the wireless power transmitter 600 may further include separate coils respectively corresponding to the transmission coil 622, that is, the first to n-th transmission coils, and perform in-band communication with the wireless power receiver using the separate coils.

Although the wireless power transmitter 600 and the wireless power receiver perform in-band communication in the description of FIG. 6, this is merely exemplary and short-range bidirectional communication may be performed through a frequency band different from a frequency band used to transmit the wireless power signal. For example, short-range bidirectional communication may be any one of Bluetooth communication, RFID communication, UWB communication and ZigBee communication.

Although the power transmission unit 620 of the wireless power transmitter 600 includes the multiplexer 621 and the plurality of transmission coils 622 in the description of FIG. 6, this is merely exemplary and it should be noted that the power transmission unit 620 according to another embodiment includes one transmission coil.

Figure 7:
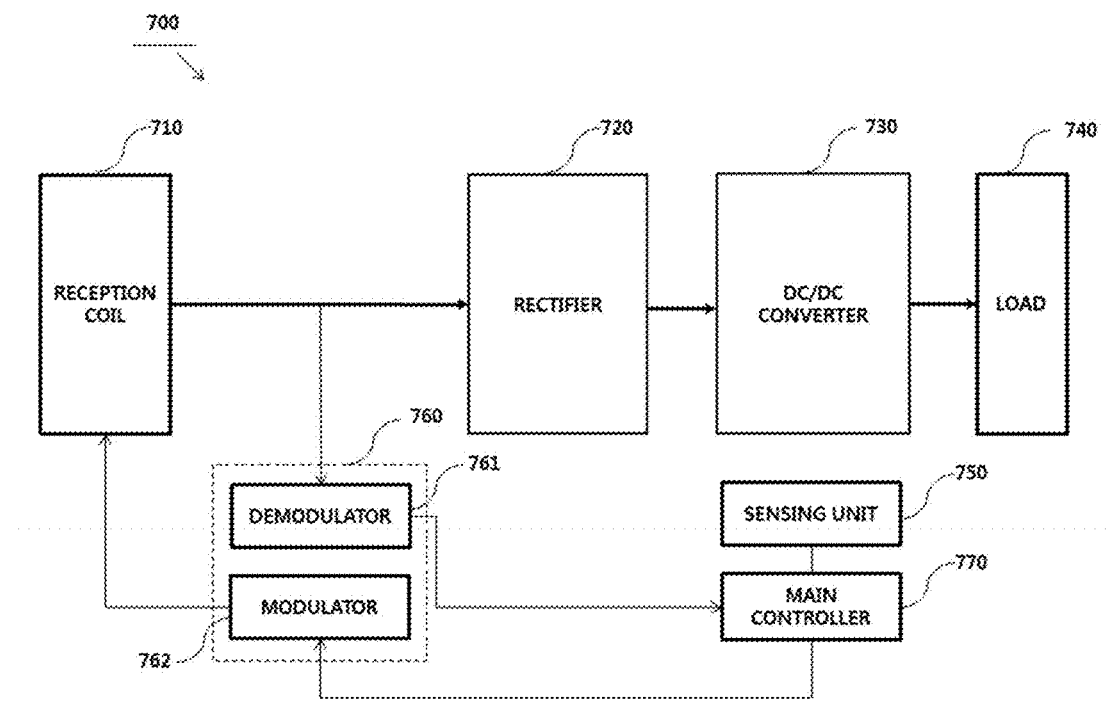
FIG. 7 is a block diagram illustrating the structure of a wireless power receiver interworking with the wireless power transmitter shown in FIG. 6.

FIG. 7 is a block diagram illustrating the structure of a wireless power receiver interworking with the wireless power transmitter shown in FIG. 6.

Referring to FIG. 7, a wireless power receiver 700 may include a reception coil 710, a rectifier 720, a DC/DC converter 730, a load 740, a sensing unit 750, a communication unit 760, and a main controller 770. Here, the communication unit 760 may include at least one of a demodulator 761 or a modulator 762.

Although the wireless power receiver 700 shown in the example of FIG. 7 is shown as exchanging information with the wireless power transmitter 600 through in-band communication, this is merely exemplary and the communication unit 760 according to another embodiment may provide short-range bidirectional communication through a frequency band different from a frequency band used to transmit a wireless power signal.

AC power received through the reception coil 710 may be transmitted to the rectifier 720. The rectifier 720 may convert the AC power into DC power and transmit the DC power to the DC-to-DC converter 730. The DC-to-DC converter 730 may convert the strength of the DC power output from the rectifier into a specific strength required by the load 740 and transmit the converted power to the load 740.

The sensing unit 750 may measure the strength of the DC power output from the rectifier 720 and provide the strength to the main controller 770. In addition, the sensing unit 750 may measure the strength of current applied to the reception coil 710 according to wireless power reception and transmit the measured result to the main controller 770. In addition, the sensing unit 750 may measure the internal temperature of the wireless power receiver 700 and provide the measured temperature value to the main controller 770.

For example, the main controller 770 may compare the strength of the DC power output from the rectifier with a predetermined reference value and determine whether overvoltage occurs. Upon determining that overvoltage occurs, a predetermined packet indicating that overvoltage has occurred may be generated and transmitted to the modulator 762. The signal modulated by the modulator 762 may be transmitted to the wireless power transmitter 600 through the reception coil 710 or a separate coil (not shown). If the strength of the DC power output from the rectifier is equal to or greater than the predetermined reference value, the main controller 770 may determine that a sensing signal is received and perform control to transmit a signal strength indicator corresponding to the sensing signal to the wireless power transmitter 600 through the modulator 762 upon receiving the sensing signal. In another example, the demodulator 761 may demodulate the AC power signal between the reception coil 710 and the rectifier 720 or the DC power signal output from the rectifier 720, identify whether a sensing signal is received, and provide the identified result to the main controller 770. At this time, the main controller 770 may perform control to transmit the signal strength indicator corresponding to the sensing signal through the modulator 762.

Figure 8:
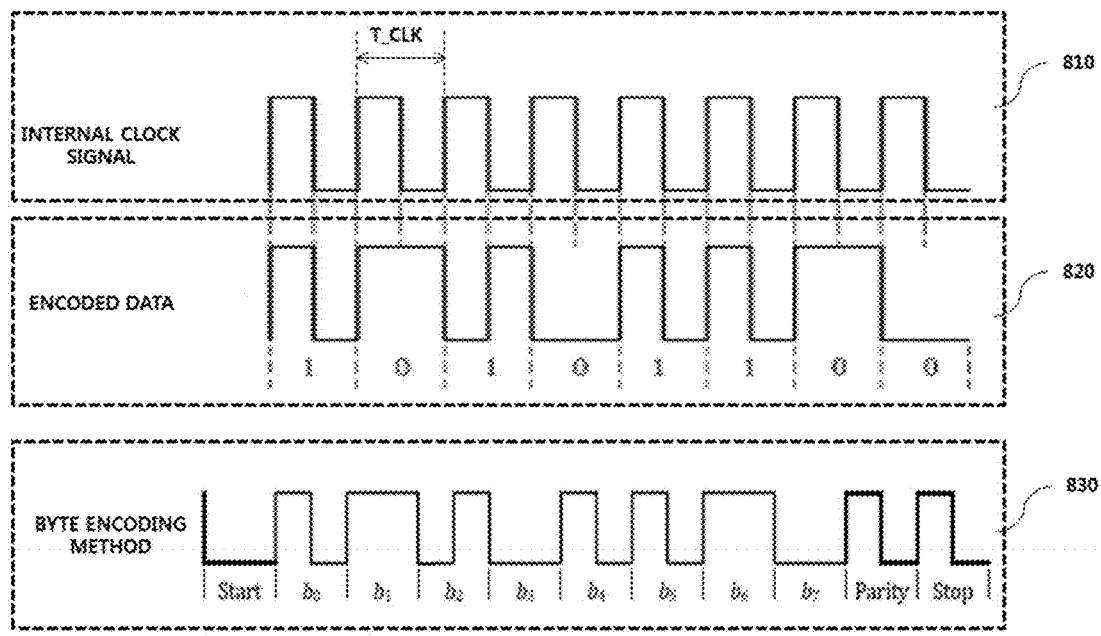
FIG. 8 is a view illustrating a method of modulating and demodulating a wireless power signal according to an embodiment.

FIG. 8 is a view illustrating a method of modulating and demodulating a wireless power signal according to an embodiment.

As denoted by reference numeral 810 of FIG. 8, the wireless power transfer end 10 and the wireless power reception end 20 may encode or decode a packet to be transmitted based on an internal clock signal having the same period.

Hereinafter, the method of encoding the packet to be transmitted will be described in detail with reference to FIGS. 1 to 8.

Referring to FIG. 1, if the wireless power transfer end 10 or the wireless power reception end 20 does not transmit a specific packet, the wireless power signal may be an unmodulated AC signal having a specific frequency as denoted by reference numeral 41 of FIG. 1. In contrast, if the wireless power transfer end 10 or the wireless power reception end 20 transmits a specific packet, the wireless power signal may be an AC signal modulated using a specific modulation method as denoted by reference numeral 42 of FIG. 1. For example, the modulation method may include, but is not limited to, an amplitude modulation method, a frequency modulation method, a frequency and amplitude modulation method, a phase modulation method, etc.

Differential biphase encoding is applicable to binary data of the packet generated by the wireless power transfer end 10 or the wireless power reception end 20 as denoted by reference numeral 820. Specifically, differential biphase encoding has two state transitions to encode data bit 1 and one state transition to encode data bit 0. That is, data bit 1 is encoded such that transition between a HI state and a LO state occurs in a rising edge and a falling edge of the clock signal and data bit 0 is encoded such that transition between a HI state and a LO state occurs in a rising edge of the clock signal.

A byte encoding method denoted by reference numeral 830 is applicable to the encoded binary data. Referring to reference numeral 830, the byte encoding method according to the embodiment may be a method of inserting a start bit and a stop bit for identifying start and stop of the bit stream with respect to the 8-bit encoded binary bit stream and a parity bit for sensing whether an error of the bit stream (byte) occurs.

Figure 9:
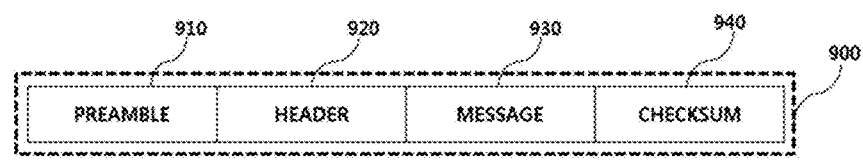
FIG. 9 is a view illustrating a packet format according to an embodiment.

FIG. 9 is a view illustrating a packet format according to an embodiment.

Referring to FIG. 9, a packet format 900 used for information exchange between the wireless power transfer end and the wireless power reception end 20 may include a preamble 910 field for acquiring synchronization for demodulation of the corresponding packet and identifying an accurate start bit of the corresponding packet, a header 920 field for identifying the type of a message included in the corresponding packet, a message 930 field for transmitting the content (or payload) of the corresponding packet, and a checksum 940 field for identifying whether an error has occurred in the corresponding packet.

A packet reception end may identify the size of the message 930 included in the corresponding packet based on the value of the header 920.

In addition, the header 920 may be defined for each phase of the wireless power transfer procedure, and the value of the header 920 may be defined as the same value in different phases. For example, referring to FIG. 10, it should be noted that the header value corresponding to end power transfer of the ping phase and end power transfer of the power transfer phase is 0x02.

The message 930 includes data to be transmitted by the transmission end of the corresponding packet. For example, the data included in the message 930 field may be a report, a request, or a response, without being limited thereto.

The packet 900 according to another embodiment may further include at least one of transmission end identification information for identifying the transmission end for transmitting the corresponding packet and reception end identification information for identifying the reception end for receiving the corresponding packet. The transmission end identification information and the reception end identification may include IP address information, MAC address information, product identification information, etc. However, the present disclosure is not limited thereto and information for distinguishing the reception end and the transmission end in the wireless charging system may be included.

The packet 900 according to another embodiment may further include predetermined group identification information for identifying a reception group if the corresponding packet needs to be received by a plurality of apparatuses.

FIG. 10 is a view illustrating the types of packets transmitted from the wireless power receiver to the wireless power transmitter according to an embodiment.

Referring to FIG. 10, the packet transmitted from the wireless power receiver to the wireless power transmitter may include a signal strength packet for transmitting the strength information of a sensed ping signal, a power transfer type (end power transfer) for requesting power transfer end from the transmitter, a power control hold-off packet for transferring time information waiting until actual power is controlled after a control error packet for control is received, a configuration packet for transferring configuration information of the receiver, an identification packet and an extended identification packet for transmitting receiver identification information, a general request packet for transmitting a general request message, a specific request packet for transmitting a specific request message, an FOD status packet for transmitting a reference quality factor value for FO detection, a control error packet for controlling power transmitted by the transmitter, a renegotiation packet for starting renegotiation, a 24-bit received power packet and 8-bit received power packet for transmitting the strength information of the received power, and a charge status packet for transmitting the current charging status information of the load.

The packets transmitted from the wireless power receiver to the wireless power transmitter may be transmitted using in-band communication using the same frequency band as the frequency band used to transmit wireless power.

Figure 11:
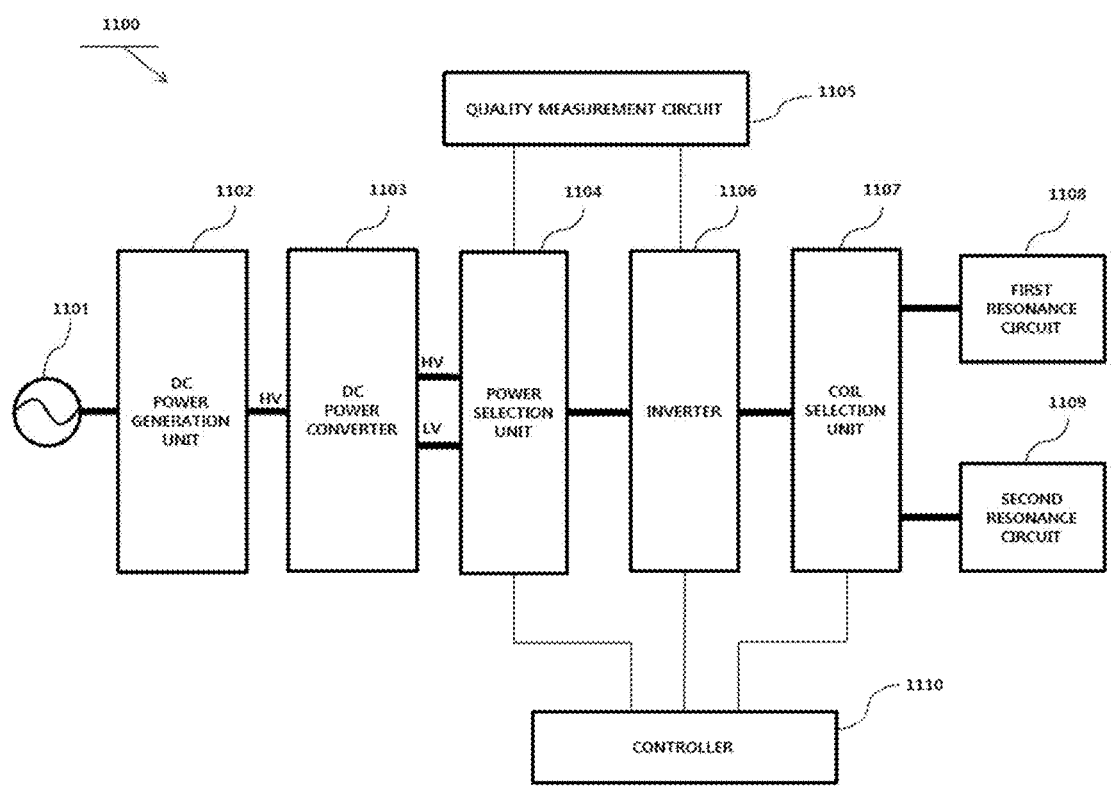
FIG. 11 is a block diagram for explaining a wireless power control apparatus for wireless charging according to an embodiment.

FIG. 11 is a block diagram for explaining a wireless power control apparatus for wireless charging according to an embodiment.

For example, the wireless power control apparatus may be installed in a wireless power transmitter.

Referring to FIG. 11, a wireless power control apparatus 1100 may include a DC power generation unit 1102, a DC power converter 1103, a power selection unit 1104, a quality measurement circuit 1105, an inverter 1106, a coil selection unit 1107, a first resonance circuit 1108, a second resonance circuit 1109, and a controller 1110.

The DC power generation unit 1102 may receive AC power from a power source 1101 and may convert the AC power to DC power with a specific voltage. The power source 1101 may refer to a home power source or an industrial power source and may also provide AC power having an AC voltage of 120 to 277 Vac and a frequency of 50/60 Hz. A configuration and operation of the DC power generation unit 1102 will be described below in more detail with reference to FIG. 13.

The DC power converter 1103 may receive DC power of a specific voltage, i.e., a high voltage (HV or a second voltage, e.g., 300 V to 400 V) from the DC power generation unit 1102 and may adjust the intensity of the DC power to generate DC power of a low voltage (LV or a first voltage, e.g., 12 V). For example, the DC power converter 1103 may include a variable transformer for adjusting intensity of voltage and may adjust the intensity of DC power output according to a predetermined control signal of the controller 1110, but the present disclosure is not limited thereto. In another example, intensity of the output DC power of the DC power converter 1103 may be a fixed value. In another example, the DC power converter 1103 may include a circuit for outputting a high voltage received from the DC power generation unit 1102 without change, and a variable transformer circuit for converting a high voltage received from the DC power generation unit 1102 to a low voltage.

In the specification, it should be noted that the high voltage or the low voltage, and the high power or the low power do not refer to a reference for differentiating between high and low levels based on an absolute value and do not refer to high and low levels when two voltages or two power levels are compared with each other.

The DC power converter 1103 may transmit DC power of the generated low voltage LV and DC power of the high voltage HV to the power selection unit 1104. According to another embodiment, the DC power converter 1103 may not output the DC power of the high voltage HV without change, but instead, may also adjust the intensity of the DC power of the high voltage HV and may convert the DC power to DC power of a specific voltage to output the DC power of the specific voltage.

The power selection unit 1104 may transmit any one of the high voltage HV and the low voltage LV to the inverter 1106 or may activate or deactivate the quality measurement circuit 1105 under control of the controller 1110. Here, when the quality measurement circuit 1105 is activated or deactivated, this means that DC power is supplied to measure a quality factor value by the quality measurement circuit 1105 or DC power is blocked such that the quality measurement circuit 1105 is not operated.

The controller 1110 according to an embodiment may adaptively control the intensity of voltage output from the power selection unit 1104 depending on intensity of power required by a wireless power reception apparatus. For example, when the wireless power reception apparatus requires low power of 5 W or 15 W, the controller 1110 may control the power selection unit 1104 to output the low voltage LV. In contrast, when the wireless power reception apparatus requires high power of 60 W or 200 W, the controller 1110 may control the power selection unit 1104 to output the high voltage HV.

The controller 1110 may adaptively control the intensity of voltage output by the power selection unit 1104 depending on an operation mode of the wireless power transmission apparatus as well as the intensity of power required by the wireless power reception apparatus. Here, the operation mode may be broadly classified into a power transmission mode, a ping mode, and a quality measurement mode. The power transmission mode may refer to a state in which power is transmitted to a wireless power reception apparatus and may be a state corresponding to the power transfer phase 560 of FIG. 5. The ping mode may refer to a state in which a digital ping for identifying the receiver is compatible with the WPC standard is transmitted to the wireless power reception apparatus and may be a state corresponding to the ping phase 520 of FIG. 5. The quality measurement mode refers to a state in which a quality factor value is measured while an AC signal is transmitted to a wireless power reception apparatus and may be a state immediately after the negotiation phase 540 or the ping phase 520 of FIG. 5.

For example, when a current operation mode is a power transmission mode, the controller 1110 may control the power selection unit 1104 to output the low voltage LV or the high voltage HV according to whether a wireless power reception apparatus requires low power or high power. However, when the current operation mode is a ping mode or a quality measurement mode, the controller 1110 may control the power selection unit 1104 to output the low voltage LV irrespective of whether the wireless power reception apparatus requires low power or high power. In other words, in a circuit having separate coils with different transmission power levels, a single circuit may be configured to execute the ping mode and the quality measurement mode irrespective of a coil through which power is transmitted, thereby simplifying a circuit configuration and reducing manufacturing materials. The ping mode or the quality measurement mode using the low voltage LV may be executed, and thus damage and side effects of the wireless power reception apparatus may be prevented.

The quality measurement circuit 1105 may measure the quality factor value described with reference to FIG. 5 and may be transmitted to the controller 1110.

The inverter 1106 may receive DC power to generate AC power under control of the controller 1110. The inverter 1106 may include one or more of a half bridge inverter and a full bridge inverter. When the inverter 1106 includes both the half bridge inverter and the full bridge inverter, the inverter 11 may drive any one of the half bridge inverter and the full bridge inverter according to a predetermined control signal of the controller 1110. The controller 1110 may dynamically determine whether the inverter 1106 is operated as a half bridge or a full bridge.

The controller 1110 according to an embodiment may adaptively control a bridge mode of the inverter 110 depending on the intensity of power required by a wireless power reception apparatus.

For example, when the power selection unit 1104 outputs the low voltage LV, if the wireless power reception apparatus requires relatively low power, the controller 1110 may control a half bridge circuit of the inverter 1106 to be driven. In contrast, when the power selection unit 1104 outputs the low voltage LV, if the wireless power reception apparatus requires relatively high power, the controller 1110 may control a full bridge circuit of the inverter 1106 to be driven.

In another example, when the power selection unit 1104 outputs the high voltage HV, if the wireless power reception apparatus requires relatively low power, the controller 1110 may control a half bridge circuit of the inverter 1106 to be driven. In contrast, when the power selection unit 1104 outputs the high voltage HV, if the wireless power reception apparatus requires relatively high power, the controller 1110 may control a full bridge circuit of the inverter 1106 to be driven.

The controller 1110 may adaptively control a bridge mode of the inverter 1106 depending on an operation mode of a wireless power transmission apparatus as well as the intensity of power required by the wireless power reception apparatus.

For example, when the current operation mode is a power transmission mode, the controller 1110 may control the half bridge circuit of the inverter 1106 or the full bridge circuit of the inverter 1106 to be operated according to whether the wireless power reception apparatus requires relatively low power or relatively high power in a state in which the power selection unit 1104 outputs any one of the high voltage HV and the low voltage LV. However, when the current operation mode is the ping mode or the quality measurement mode, the controller 1110 may control a half bridge circuit of the inverter 1106 to be driven irrespective of power required by the wireless power reception apparatus.

The coil selection unit 1107 may select any one of the first resonance circuit 1108 or the second resonance circuit 1109 under control of the controller 1110.

The controller 1110 may adaptively control the coil selection unit 1107 to select any one of the first resonance circuit 1108 or the second resonance circuit 1109 depending on intensity of power required by the wireless power reception apparatus. For example, when the wireless power reception apparatus requires low power of 5 W or 15 W, the controller 1110 may control the coil selection unit 1107 to select the first resonance circuit 1108. In contrast, when the wireless power reception apparatus requires high power of 60 W or 200 W, the controller 1110 may control the coil selection unit 1107 to select the second resonance circuit 1109.

Each of the first resonance circuit 1108 and the second resonance circuit 1109 may be a circuit for implementing resonance by connecting an inductor and a capacitor in series or in parallel to each other.

For example, the first resonance circuit 1108 may include an inductor for transmitting power of 5 W or 15 W corresponding to low power, that is, a low power coil (or a first coil), and the second resonance circuit 1109 may include an inductor for transmitting power of 60 W or 200 W corresponding to high power, that is, a high power coil (or a second coil).

In the case of a series resonance circuit formed by connecting an inductor and a capacitor in series to each other, intensity $I_R$ of current flowing in the resonance circuit may be inversely proportional to an inductance value $R_L$ of an inductor—i.e., a transmission coil—and may be proportional to amplitude $E_V$ of AC voltage applied to each of the first resonance circuit 1108 and the second resonance circuit 1109. That is, $I_R=E_V/R_L$. Accordingly, when overcurrent flows in each of the first resonance circuit 1108 and the second resonance circuit 1109 to seriously generate heat, the controller 1110 may perform control to increase an inductance value of each of the first resonance circuit 1108 and the second resonance circuit 1109. In this case, when an inductance value of the first resonance circuit 1108 and the second resonance circuit 1109 increases, entire impedance of each of the first resonance circuit 1108 and the second resonance circuit 1109 may increase to reduce current flowing in each of the first resonance circuit 1108 and the second resonance circuit 1109.

Each of the first resonance circuit 1108 and the second resonance circuit 1109 according to an embodiment may include an impedance adjusting circuit for adjusting an entire impedance value of each of the first resonance circuit 1108 and the second resonance circuit 1109 according to a predetermined control signal of the controller 1110. For example, the impedance adjusting circuit may include a switch and an inductor. Here, it should be noted that the number of switches and inductors is changed according to a design of impedance adjustment unit and adjustment range.

When intensity of current applied to each of the first resonance circuit 1108 and the second resonance circuit 1109 is greater than a predetermined reference value, the controller 1110 may control the impedance adjusting circuit to increase impedance of each of the first resonance circuit 1108 and the second resonance circuit 1109.

When temperature measured at each of the first resonance circuit 1108 and the second resonance circuit 1109 or a wireless power transmitter is greater than a predetermined threshold value, the controller 1110 may control an impedance adjusting circuit to increase impedance of each of the first resonance circuit 1108 and the second resonance circuit 1109.

The controller 1110 may control an overall operation of the wireless power control apparatus 1100, and in particular, may control the power selection unit 1104, the inverter 1106, and the coil selection unit 1107 depending on an operation mode of a wireless power transmission apparatus and intensity of power required by a wireless power reception apparatus.

The controller 1110 may include a frequency generation device for generating a reference frequency signal and a gate driver for controlling switches included in the power selection unit 1104, the inverter 1106, and the coil selection unit 1107 according to the reference frequency signal in order to control the power selection unit 1104, the inverter 1106, and the coil selection unit 1107.

The controller 1110 may demodulate an in-band signal received from the wireless power receiver through the first resonance circuit 1108 or the second resonance circuit 1109. For example, the controller 1110 may demodulate a control error packet received at a predetermined period after entering the power transfer phase 440 or 560 and may determine intensity of transmission power based on the demodulated control error packet.

The controller 1110 may modulate a packet to be transmitted to the wireless power reception apparatus and may transmit the packet to the first resonance circuit 1108 or the second resonance circuit 1109.

Figure 12:
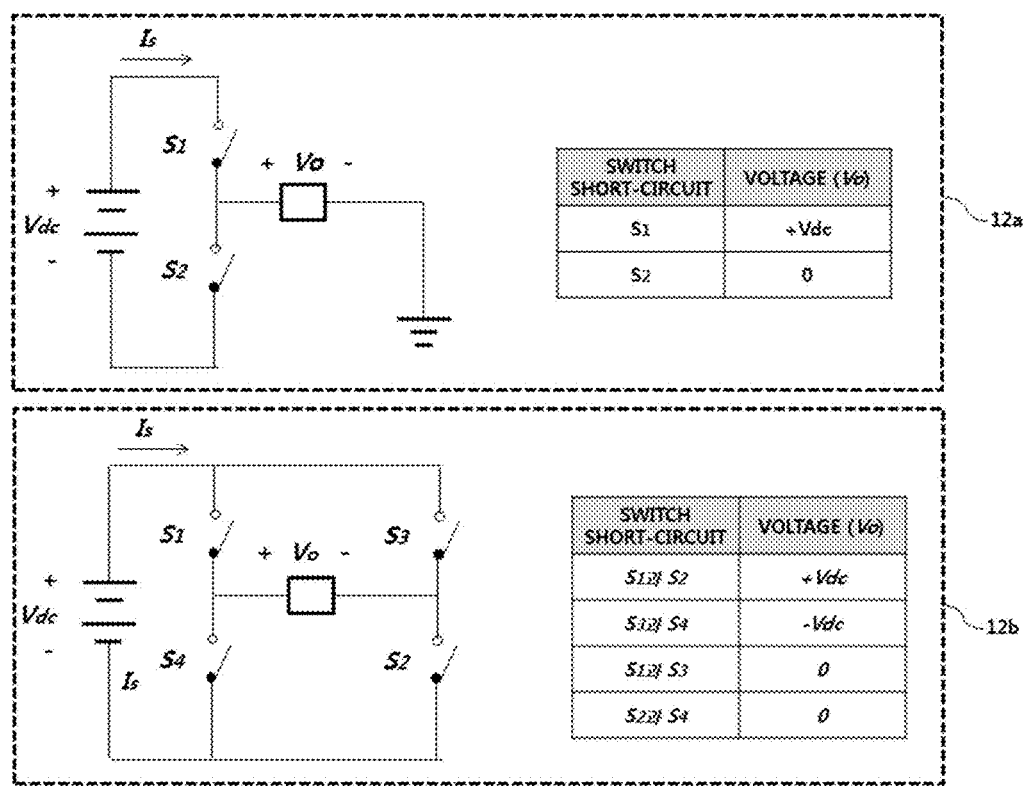
FIG. 12 is a diagram for explanation of a basic operation principle of an inverter for converting a DC signal to an AC signal to aid in understanding.

FIG. 12 is a diagram for explanation of a basic operation principle of an inverter for converting a DC signal to an AC signal to aid in understanding.

The inverter 1106 of FIG. 11 may include at least one of a half bridge type inverter or a full bridge type inverter.

Referring to reference numeral 12a, the half bridge inverter may include two switches S1 and S2, in which case an output voltage Vo may be changed according to switch ON/OFF control of a gate driver. For example, when switch S1 is short circuited and switch S2 is open, the output voltage Vo may have a value +Vdc that is an input voltage. In contrast, when switch S1 is open and switch S2 is short circuited, the output voltage Vo may have a value of 0. When switches S1 and S2 cross and are short circuited at a predetermined period, the half bridge inverter may output an AC waveform with a corresponding period.

Referring to reference numeral 12b of FIG. 12, the full bridge inverter may include four switches S1, S2, S3 and S4, and a level of the output voltage Vo may have a value of +Vdc, −Vdc, or 0 under switch ON/OFF control of a gate driver, as shown in a table included in reference numeral 12b. For example, when switches S1 and S2 are short circuited and the other switches are open, the level of the output voltage Vo may have a value of +Vdc. In contrast, when the switches S3 and S4 are short circuited and the other switches are open, the level of the output voltage Vo may have a value of −Vdc.

Figure 13:
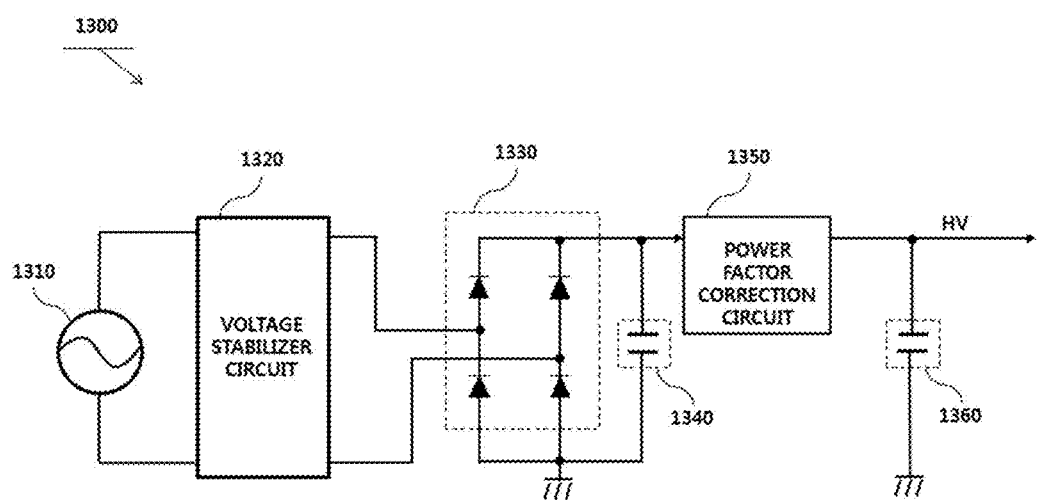
FIG. 13 is a diagram showing an embodiment of the DC power generation unit shown in FIG. 11.

FIG. 13 is a diagram showing an embodiment of the DC power generation unit shown in FIG. 11.

Referring to FIG. 13, a DC power generation unit 1300 may include a voltage stabilizer circuit 1320, a rectifier circuit 1330, a smoothing circuit, a power factor correction circuit 1350, and an output stabilizer circuit 1360.

The voltage stabilizer circuit 1320 may be a circuit for receiving AC power having an AC voltage of 120 to 277 Vac and a frequency of 50/60 Hz from an AC power source 1310 and stabilizing the AC power.

The voltage stabilizer circuit 1320 may include an electromagnetic interference (EMI) filter having a function of removing and supporting various mixed noises on a power frequency of AC power, a surge protector for blocking an excessively large amount of voltage or greater (surge) that is generated or introduced through a conductor, and an inrush current limiter for limiting introduction of inrush current.

The rectifier circuit 1330 may convert AC power transmitted through the voltage stabilizer circuit 1320 to DC power and may include a full-wave rectification bridge circuit as shown in FIG. 13, but the scope of the embodiments is not limited thereto.

The smoothing circuit may be a circuit for reducing ripple and pulsation of the rectified DC power, and may be implemented by capacitors connected in parallel to each other, as shown in FIG. 13.

The power factor correction circuit 1350 may be a circuit for correcting a phase difference between voltage and current of the rectified power.

The output stabilizer circuit 1360 may be a circuit for preventing a voltage level of the high voltage HV as output of the power factor correction circuit 1350 from shaking, and may be implemented by capacitors connected in parallel to each other, as shown in FIG. 13.

Figure 14:
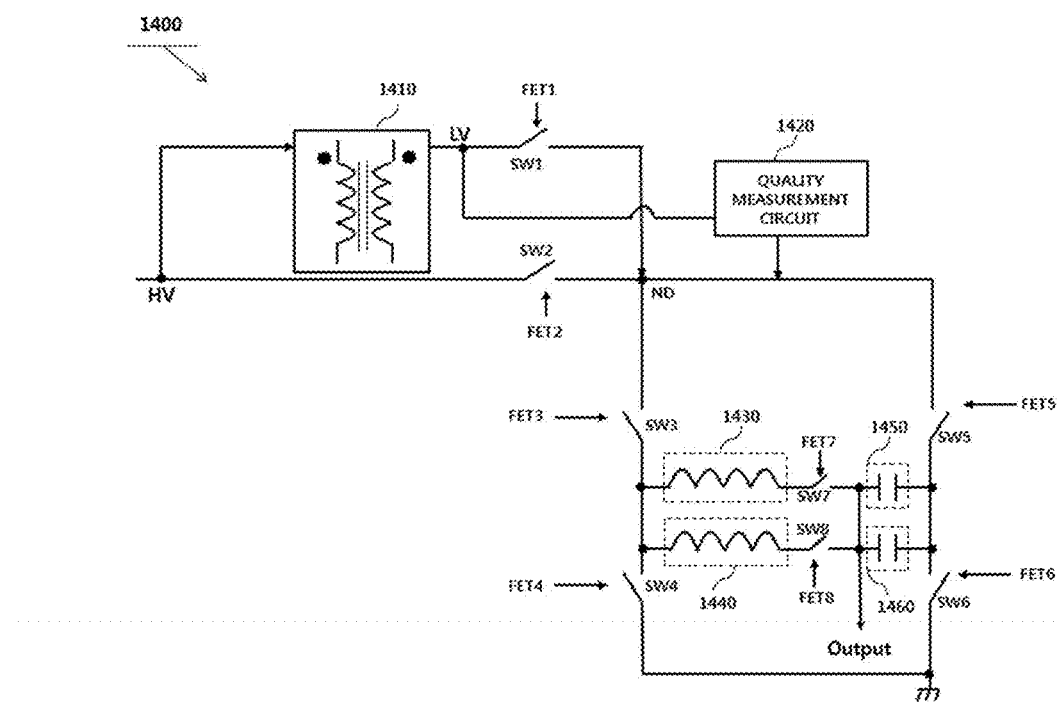
FIG. 14 is a diagram showing an embodiment of the wireless power control apparatus shown in FIG. 11.

FIG. 14 is a diagram showing an embodiment of the wireless power control apparatus shown in FIG. 11.

Referring to FIG. 14, a wireless power control apparatus 1400 may include components corresponding to the remaining components except for the DC power generation unit 1102 and the controller 1110.

In detail, the wireless power control apparatus 1400 may include a transformer 1410, first and second switches SW1 and SW2, a quality measurement circuit 1420, third to sixth switches SW3 to SW6, seventh and eighth switches SW7 and SW8, a first transmission coil 1430 and a first capacitor 1450, and a second transmission coil 1440 and a second capacitor 1460.

Here, the transformer 1410 and a path for bypassing the high voltage HV to the second switch SW2 may correspond to the DC power converter 1103 of FIG. 11, and the first and second switches SW1 and SW2 may correspond to the power selection unit 1104 of FIG. 11.

The quality measurement circuit 1420 may correspond to the quality measurement circuit 1105 of FIG. 11, and the third to sixth switches SW3 to SW6 may correspond to the inverter 1106 of FIG. 11.

The seventh and eighth switches SW7 and SW8 may correspond to the coil selection unit 1107 of FIG. 11, and the first transmission coil 1430 and the first capacitor 1450, and the second transmission coil 1440 and the second capacitor 1460 may correspond to the first resonance circuit 1108 and the second resonance circuit 1109 of FIG. 11, respectively.

The transformer 1410 may receive DC power of the high voltage HV from the DC power generation unit 1102 and may convert a voltage of the DC power to output the DC power of the low voltage LV.

The first switch SW1 may be turned on or off according to a first gate signal FET1, the low voltage LV may be transferred to the node ND and may be blocked, and the low voltage LV may be transferred to the quality measurement circuit 1420. The second switch SW1 may be turned on or off according to a second gate signal FET2 and the high voltage HV may be transferred to the node ND or may be blocked.

The third to sixth switches SW3 to SW6 may be turned on or off according to third to sixth gate signals FET3 to FET6, respectively, and may be operated as a half bridge inverter or a full bridge inverter.

The seventh and eighth switches SW7 and SW8 may be turned on or off according to the seventh and eighth switches SW7 and SW8, respectively, and may control to allow current to flow in the first transmission coil 1430 or the second transmission coil 1440. That is, the seventh and eighth switches SW7 and SW8 may select any one of a first resonance circuit corresponding to the first transmission coil 1430 and the first capacitor 1450 or a second resonance circuit corresponding to the second transmission coil 1440 and the second capacitor 1460.

For example, the first transmission coil 1430 may be a low-power coil for transmitting low power of 5 W or 15 W, and the second transmission coil 1440 may be a high-power coil for transmitting high power of 60 W or 200 W, but the scope of the present disclosure is not limited thereto.

The first to eighth gate signals FET1 to FET8 may be generated by the controller 1110, and each of the first to eighth gate signals FET1 to FET8 may have a first level (e.g., a high level) for turning on a corresponding switch or a second level (e.g., e.g., a low level) for turning off a corresponding switch.

Each of the first to eighth switches SW1 to SW8 may be implemented as a MOSFET switch, but the scope of the present disclosure is not limited thereto.

Figure 15:
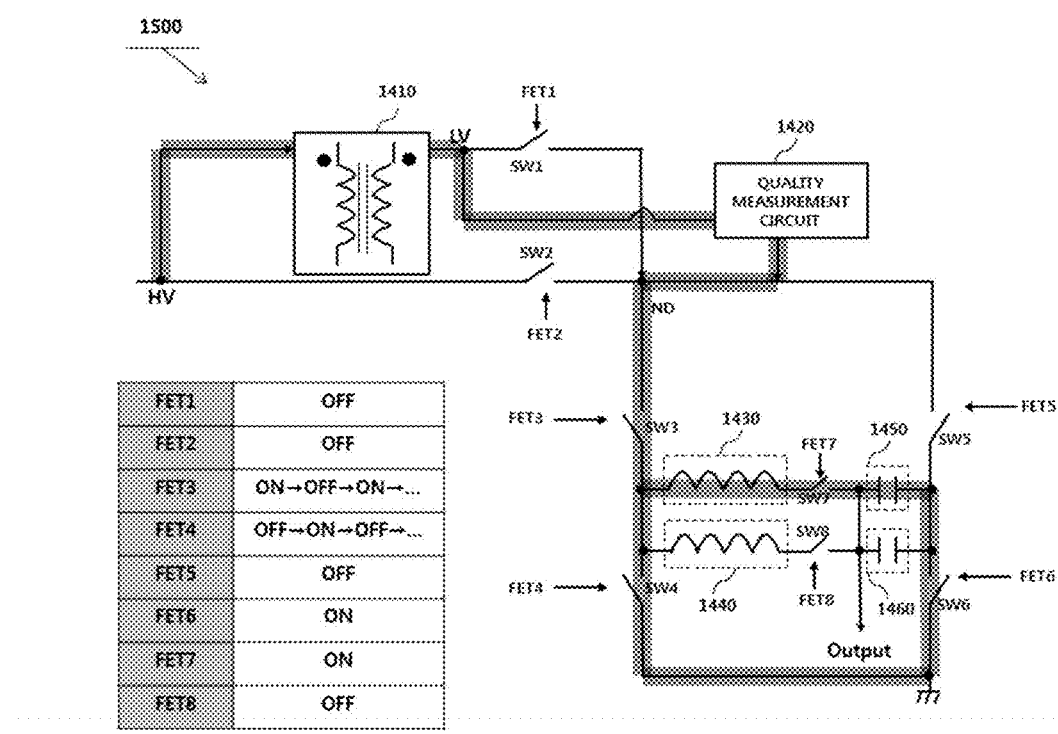
FIG. 15 is a diagram for explanation of an embodiment of an operation of the wireless power control apparatus shown in FIG. 14 in a quality measurement mode.

FIG. 15 is a diagram for explanation of an embodiment of an operation of the wireless power control apparatus shown in FIG. 14 in a quality measurement mode.

Referring to FIG. 15, a current path in the wireless power control apparatus 1400 according to whether the first to eighth switches SW1 to SW8 are open or closed is shaded in a wireless power control apparatus 1500, and a table of an on or off control state of the first to eighth gate signals FET1 to FET8 is shown together.

When a current operation mode is a quality measurement mode of a low-power coil, as both the first switch SW1 and the second switch SW2 are turned off, the low voltage LV may be transferred to the quality measurement circuit 1420 to allow current to flow through the quality measurement circuit 1420. The third switch SW3 and the fourth switch SW4 may be controlled according to a gate signal with the same period and opposite phases, and as the fifth switch SW5 is turned off and the sixth switch SW6 is turned on, the third to sixth switches SW3 to SW6 may be operated as a half bridge inverter.

As the seventh switch SW7 is turned on and the eighth switch SW8 is turned off, power applied through a half bridge may be transferred to the first resonance circuit.

That is, the wireless power control apparatus 1500 may be operated in a quality measurement mode for acquisition of a quality factor value of the first transmission coil 1430 that is a low-power coil.

Figure 16:
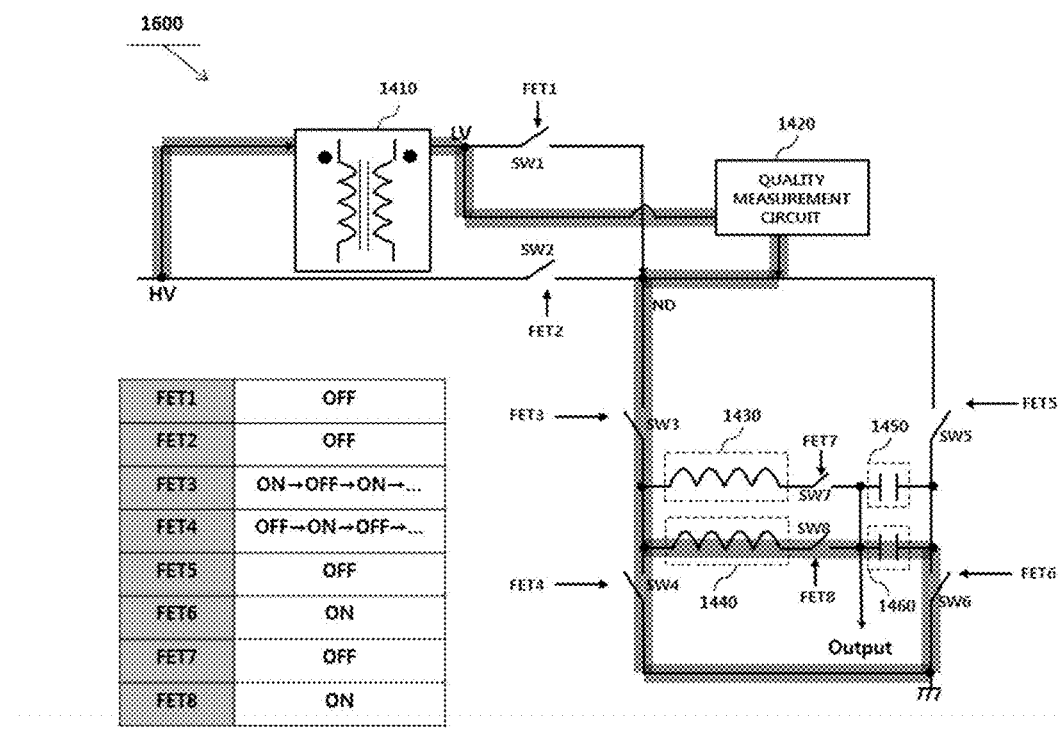
FIG. 16 is a diagram for explanation of another embodiment of an operation of the wireless power control apparatus shown in FIG. 14 in a quality measurement mode.

FIG. 16 is a diagram for explanation of another embodiment of an operation of the wireless power control apparatus shown in FIG. 14 in a quality measurement mode.

Referring to FIG. 16, a current path in the wireless power control apparatus 1400 according to whether the first to eighth switches SW1 to SW8 are open or closed is shaded in a wireless power control apparatus 1600, and a table of an on or off control state of the first to eighth gate signals FET1 to FET8 is shown together.

When a current operation mode is a quality measurement mode of a high-power mode, as both the first switch SW1 and the second switch SW2 are turned off, the low voltage LV may be transferred to the quality measurement circuit 1420 to allow current to flow through the quality measurement circuit 1420. The third switch SW3 and the fourth switch SW4 may be controlled according to a gate signal with the same period and opposite phases, and as the fifth switch SW5 is turned off and the sixth switch SW6 is turned on, the third to sixth switches SW3 to SW6 may operate as a half bridge inverter.

As the seventh switch SW7 is turned on and the eighth switch SW8 is turned off, power applied through a half bridge may be transferred to the second resonance circuit.

That is, the wireless power control apparatus 1600 may be operated in a quality measurement mode for acquisition of a quality factor value of the second transmission coil 1440 that is a high-power coil.

Referring to FIGS. 15 and 16, both in the case in which the wireless power control apparatus 1600 is operated in a quality measurement mode for acquisition of a quality factor value for the first transmission coil 1430 that is a low-power coil or in the case in which the wireless power control apparatus 1600 is operated in a quality measurement mode for acquisition of a quality factor value for the second transmission coil 1440 that is a high-power coil, the quality measurement circuit 1420 may measure a quality factor value using the low voltage LV, in this regard, this is because required power to be transmitted through a high-power coil is not high even if a quality factor value of a high-power coil is measured. Accordingly, the quality measurement circuit 1420 may measure a quality factor value using the low voltage LV irrespective of whether the quality measurement mode is related to a low-power coil or a high-power coil, and thus power consumed in the wireless power transmission apparatus may be minimized. A high voltage may be applied to the quality measurement circuit 1420 to prevent danger of damage of the quality measurement circuit 1420.

Figure 17:
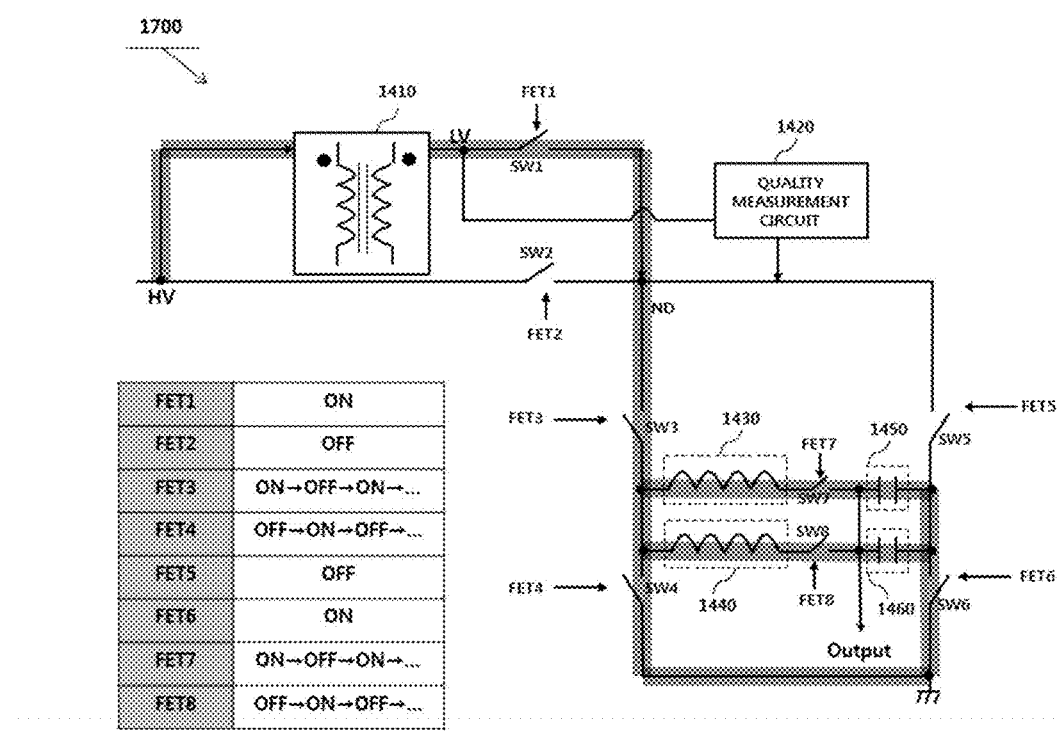
FIG. 17 is a diagram for explanation of an embodiment of an operation of the wireless power control apparatus shown in FIG. 14 in a ping mode.

FIG. 17 is a diagram for explanation of an embodiment of an operation of the wireless power control apparatus shown in FIG. 14 in a ping mode.

Referring to FIG. 17, a current path in the wireless power control apparatus 1400 according to whether the first to eighth switches SW1 to SW8 are open or closed is shaded in a wireless power control apparatus 1700, and a table of an on or off control state of the first to eighth gate signals FET1 to FET8 is shown together.

When a current operation mode is a ping mode for a low-power coil and a high-power coil, as the first switch SW1 is turned on and the second switch SW2 is turned off, the low voltage LV may be transferred to the node ND. The third switch SW3 and the fourth switch SW4 may be controlled according to a gate signal with the same period and opposite phases, and as the fifth switch SW5 is turned off and the sixth switch SW6 is turned on, the third to sixth switches SW3 to SW6 may be operated as a half bridge inverter.

As the seventh switch SW7 and the eighth switch SW8 are controlled according to a gate signal with the same period and opposite phases, the first resonance circuit and the second resonance circuit may be alternately selected. In this case, a period of the seventh gate signal FET7 and the eighth gate signal FET8 may be defined as a time required for complete transmission of a digital ping through one transmission coil, and may be different from a period of the third gate signal FET3 and the fourth gate signal FET4.

Thus, a digital ping through the first transmission coil 1430 and a digital ping through the second transmission coil 1440 may be alternately transmitted.

As shown in FIG. 17, both in the case in which the wireless power control apparatus 1700 is operated in a ping mode for transmitting a digital ping through the first transmission coil 1430 that is a low-power coil or in the case in which the wireless power control apparatus 1700 is operated in a ping mode for transmitting a digital ping through the second transmission coil 1440 that is a high-power coil, a digital ping may be generated using the low voltage LV, in this regard, this is because power required for a digital ping for wake-up of a wireless power reception apparatus irrespective of whether the wireless power reception apparatus requires low power or high power. Thus, a digital ping may be generated using the low voltage LV irrespective of whether the ping mode is related to a low-power coil or a high-power coil, and thus power consumed in the wireless power transmission apparatus may be minimized.

Figure 18:
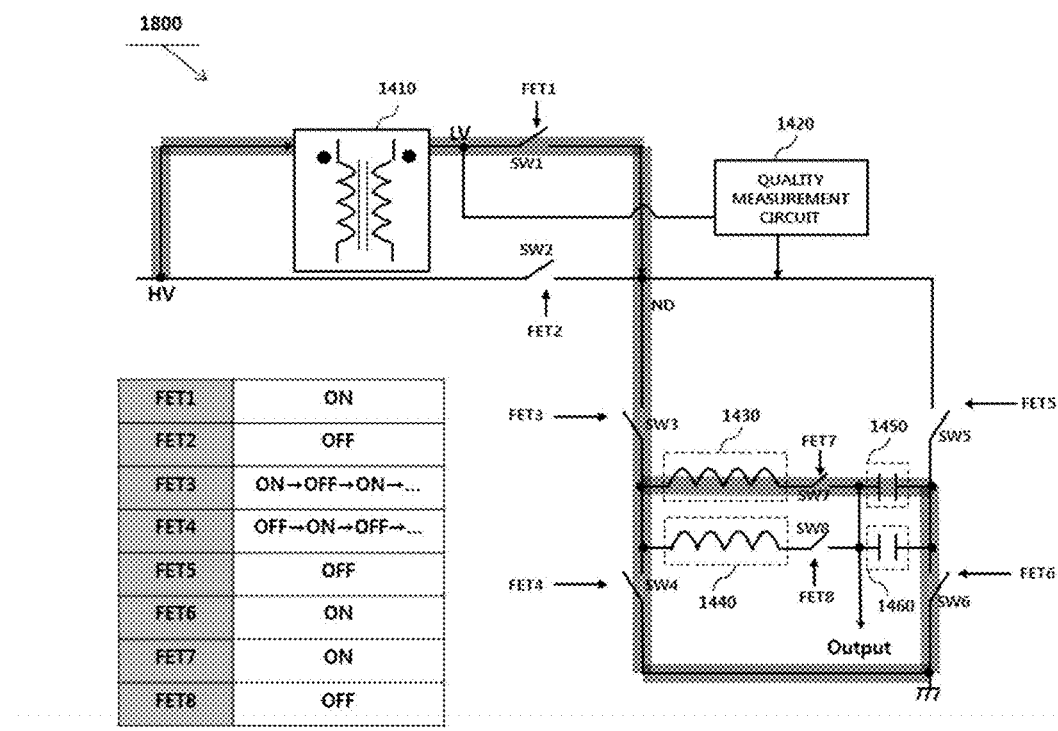
FIG. 18 is a diagram for explanation of an operation of the wireless power control apparatus shown in FIG. 14 in a power transmission mode.

FIG. 18 is a diagram for explanation of an operation of the wireless power control apparatus shown in FIG. 14 in a power transmission mode.

Referring to FIG. 18, a current path in the wireless power control apparatus 1400 according to whether the first to eighth switches SW1 to SW8 are open or closed is shaded in a wireless power control apparatus 1800, and a table of an on or off control state of the first to eighth gate signals FET1 to FET8 is shown together.

When a current operation mode is a power transmission mode for a wireless power reception apparatus that requires first power (e.g., 5 W), as the first switch SW1 is turned on and the second switch SW2 is turned off, the low voltage LV may be transferred to the node ND. The third switch SW3 and the fourth switch SW4 may be controlled according to a gate signal with the same period and opposite phases, and as the fifth switch SW5 is turned off and the sixth switch SW6 is turned on, the third to sixth switches SW3 to SW6 may be operated as a half bridge inverter.

As the seventh switch SW7 is turned on and the eighth switch SW8 is turned off, power applied through a half bridge may be transferred to the first resonance circuit.

That is, the wireless power control apparatus 1800 may be operated in a power transmission mode in which the low voltage LV and wireless power generated using a half bridge inverter are transmitted to a wireless power reception apparatus for making a request for first power (e.g., 5 W) through the first transmission coil 1430 that is a low-power coil.

Figure 19:
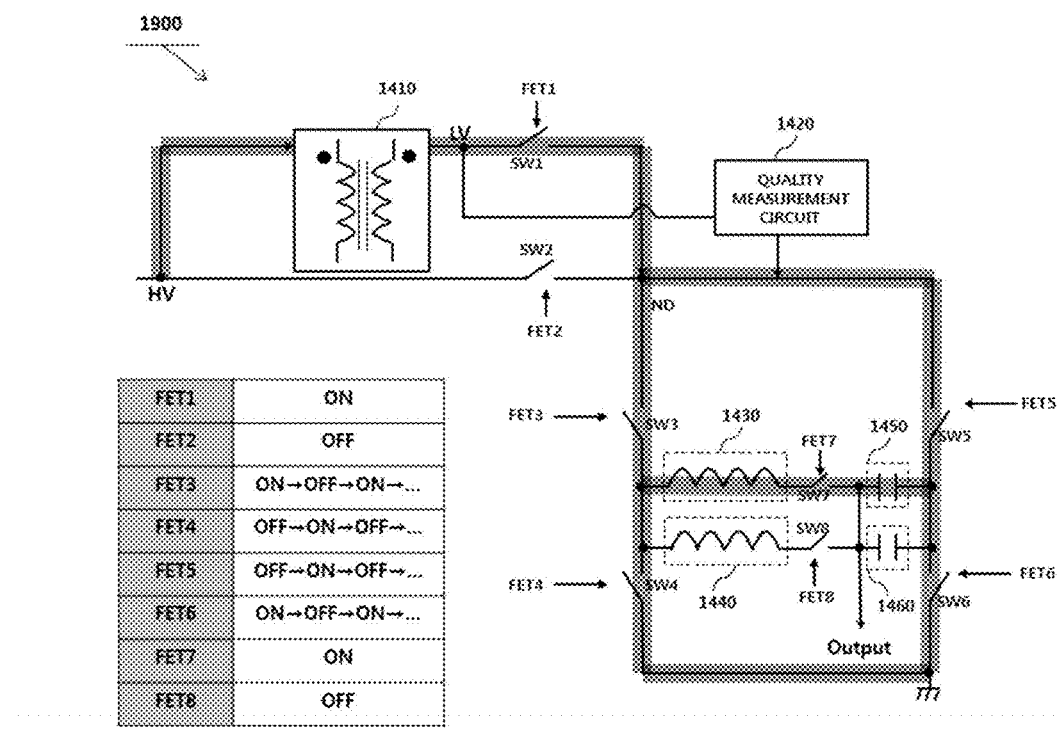
FIG. 19 is a diagram for explanation of another embodiment of an operation of the wireless power control apparatus shown in FIG. 14 in a power transmission mode.

FIG. 19 is a diagram for explanation of another embodiment of an operation of the wireless power control apparatus shown in FIG. 14 in a power transmission mode.

Referring to FIG. 19, a current path in the wireless power control apparatus 1400 according to whether the first to eighth switches SW1 to SW8 are open or closed is shaded in a wireless power control apparatus 1900, and a table of an on or off control state of the first to eighth gate signals FET1 to FET8 is shown together.

When a current operation mode is a power transmission mode for a wireless power reception apparatus for making a request for second power (e.g., 15 W), as the first switch SW1 is turned on and the second switch SW2 is turned off, the low voltage LV may be transferred to the node ND. The third switch SW3 and the fourth switch SW4 may be controlled according to a gate signal with the same period and opposite phases, and as the fifth switch SW5 and the sixth switch SW6 are controlled in the same way as the fourth switch SW4 and the third switch SW3, respectively, the third to sixth switches SW3 to SW6 may be operated as a full bridge inverter.

As the seventh switch SW7 is turned on and the eighth switch SW8 is turned off, power applied through a full bridge may be transferred to a first resonance circuit.

That is, the wireless power control apparatus 1900 may be operated in a power transmission mode in which the low voltage LV and wireless power generated using a full bridge inverter are transmitted to a wireless power reception apparatus for making a request for second power (e.g., 15 W) through the first transmission coil 1430 that is a low-power coil.

Figure 20:
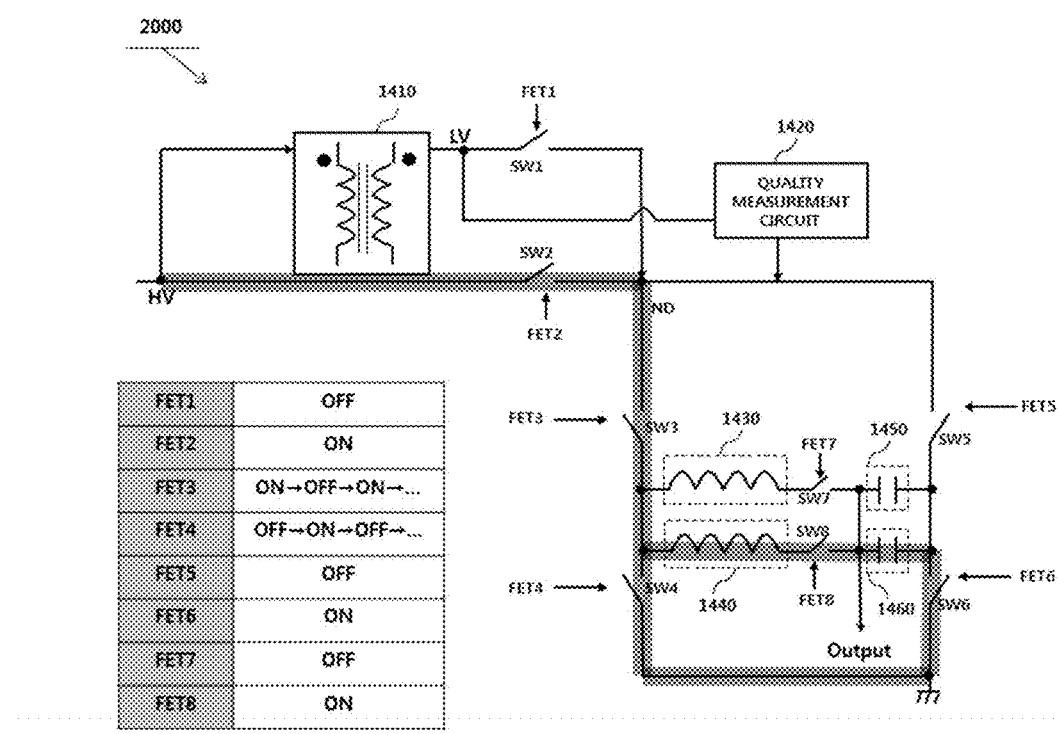
FIG. 20 is a diagram for explanation of another embodiment of an operation of the wireless power control apparatus shown in FIG. 14 in a power transmission mode.

FIG. 20 is a diagram for explanation of another embodiment of an operation of the wireless power control apparatus shown in FIG. 14 in a power transmission mode.

Referring to FIG. 20, a current path in the wireless power control apparatus 1400 according to whether the first to eighth switches SW1 to SW8 are open or closed is shaded in a wireless power control apparatus 2000, and a table of an on or off control state of the first to eighth gate signals FET1 to FET8 is shown together.

When a current operation mode is a power transmission mode for a wireless power reception apparatus for making a request for third power (e.g., 60 W), as the first switch SW1 is turned off and the second switch SW2 is turned on, the high voltage HV may be transferred to the node ND. The third switch SW3 and the fourth switch SW4 may be controlled according to a gate signal with the same period and opposite phases, and as the fifth switch SW5 is turned off and the sixth switch SW6 is turned on, the third to sixth switches SW3 to SW6 may be operated as a half bridge inverter.

As the seventh switch SW7 is turned off and the eighth switch SW8 is turned on, power applied through a half bridge may be transferred to a second resonance circuit.

That is, the wireless power control apparatus 2000 may be operated in a power transmission mode in which the high voltage HV and wireless power generated using a half bridge inverter are transmitted to a wireless power reception apparatus for making a request for third power (e.g., 60 W) through the second transmission coil 1440 that is a low-power coil.

Figure 21:
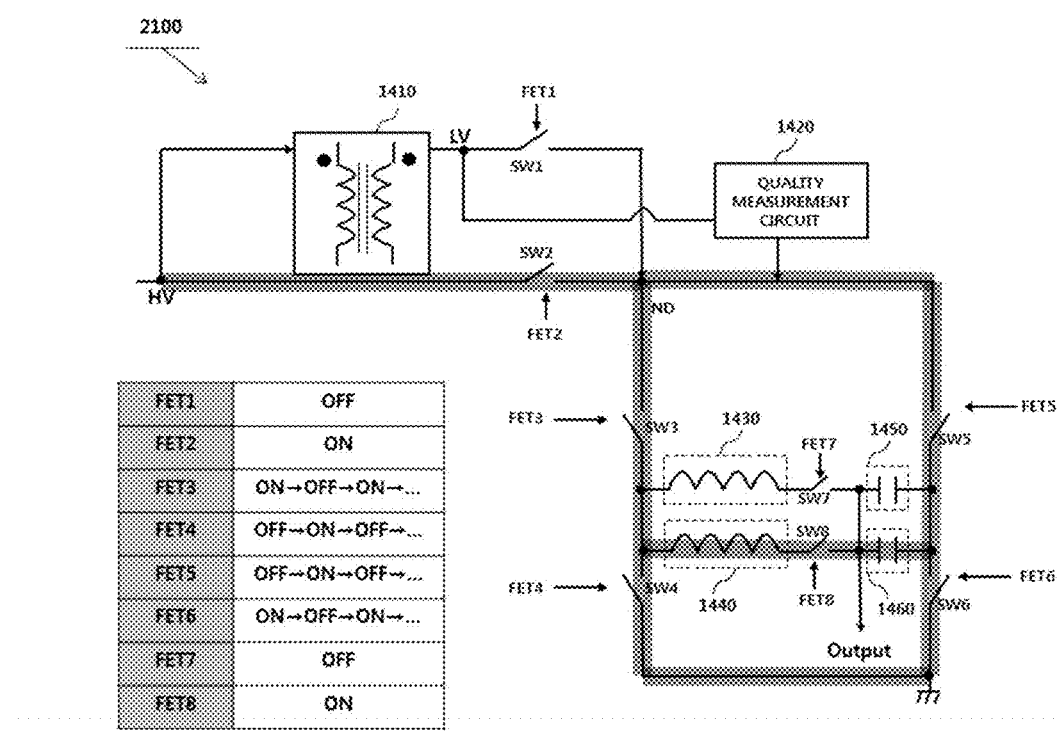
FIG. 21 is a diagram for explanation of another embodiment of an operation of the wireless power control apparatus shown in FIG. 14 in a power transmission mode.

FIG. 21 is a diagram for explanation of another embodiment of an operation of the wireless power control apparatus shown in FIG. 14 in a power transmission mode.

Referring to FIG. 21, a current path in the wireless power control apparatus 1400 according to whether the first to eighth switches SW1 to SW8 are open or closed is shaded in a wireless power control apparatus 2100, and a table of an on or off control state of the first to eighth gate signals FET1 to FET8 is shown together.

When a current operation mode is a power transmission mode for a wireless power reception apparatus for making a request for fourth power (e.g., 200 W), as the first switch SW1 is turned off and the second switch SW2 is turned on, the high voltage HV may be transmitted to the node ND. The third switch SW3 and the fourth switch SW4 may be controlled according to a gate signal with the same period and opposite phases, and as the fifth switch SW5 and the sixth switch SW6 are controlled in the same way as the fourth switch SW4 and the third switch SW3, respectively, the third to sixth switches SW3 to SW6 may be operated as a full bridge inverter.

As the seventh switch SW7 is turned off and the eighth switch SW8 is turned on, power applied through a full bridge may be transferred to a second resonance circuit.

That is, the wireless power control apparatus 2100 may be operated in a power transmission mode in which the high voltage HV and wireless power generated using a full bridge inverter are transmitted to a wireless power reception apparatus for making a request for fourth power (e.g., 200 W) through the second transmission coil 1440 that is a high-power coil.

The operation of the wireless power control apparatus described with reference to FIGS. 15 to 21 is now summarized, and when a current operation mode is a quality measurement mode or a ping mode, the controller 1110 may perform control to measure quality or to transmit a digital ping using the low voltage LV and a half bridge inverter, may perform control to select a transmission coil that intends to acquire a quality factor value in a quality measurement mode, or may perform control to alternately select the transmission coil in the ping mode, irrespective of required power of a wireless power reception apparatus. The controller 1110 may generate transmission power using the low voltage LV and a half bridge inverter in a ping mode or a quality measurement mode, but this is merely exemplary, and in another mode in which relatively high transmission power is not required, transmission power may also be generated using the low voltage LV and the half bridge inverter irrespective of required power of the wireless power reception apparatus.

When a current operation mode is a power transmission mode, if a wireless power reception apparatus makes a request for low power (e.g., 5 W or 15 W), the wireless power reception apparatus may be controlled to generate wireless power using the low voltage LV and may be controlled to select a low-power coil. When relatively low power (e.g., 5 W) of low power is requested, the controller 1110 may perform control to generate wireless power using a half bridge inverter, or when relatively high power (e.g., 15 W) of low power is requested, the controller 1110 may perform control to generate wireless power using a full bridge inverter.

When the current operation mode is a power transmission mode, if the wireless power reception apparatus makes a request for high power (e.g., 60 W or 200 W), the controller 1110 may perform control to generate wireless power using the high voltage HV and may perform control to select a high-power coil. When relatively low power of high power (e.g., 60 W) is requested, the controller 1110 may perform control to generate wireless power using a half bridge inverter, or when relatively high power (e.g., 200 W) of high power is requested, the controller 1110 may perform control to generate wireless power using a full bridge inverter.

Accordingly, a wireless power control apparatus according to an embodiment may generate DC power of a low voltage for generating lower power and a high voltage for generating high power using a commercial AC power source.

A plurality of transmission coils belonging to different categories may be installed in a single wireless power transmission apparatus to support a wireless power reception apparatus that makes a request for various types of power.

In addition, transmission power may be generated using a low voltage in a ping mode, a quality measurement mode, or the like, which do not make a request for relatively high transmission power, and thus power consumed in the wireless power transmission apparatus may be minimized.

Although the number of a plurality of transmission coils belonging to different categories is 2 in the specification, the same technological idea may also be applied to three or more transmission coils, needless to say.

Figure 22:
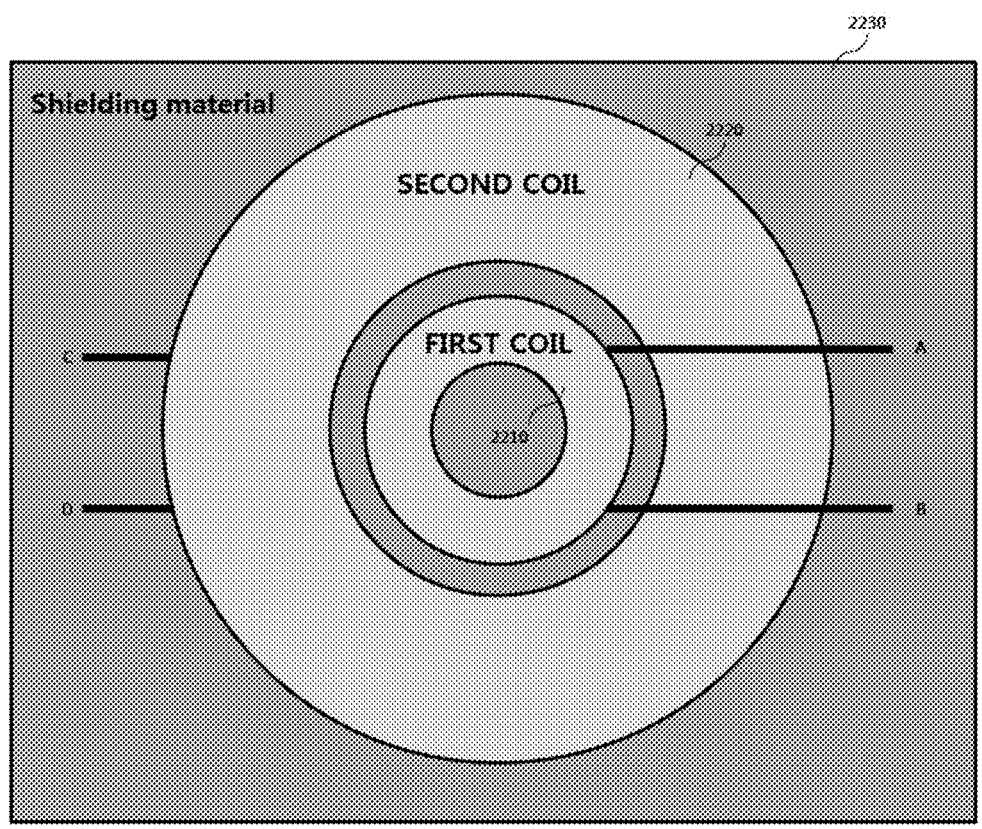
FIG. 22 is a diagram for explanation of arrangement of a plurality of transmission coils according to an embodiment.

FIG. 22 is a diagram for explanation of arrangement of a plurality of transmission coils according to an embodiment.

Referring to FIG. 22, a first coil 2210 and a second coil 2220 may correspond to the first transmission coil 1430 and the second transmission coil 1440 of FIG. 14, respectively. A shielding material 2230 for preventing wireless power transmitted from the first coil 2210 and the second coil 2220 from being transferred to a control circuit board, that is, a board of the wireless power control apparatus 1100 of FIG. 11, into which the remaining components except for a transmission coil are integrated, may be disposed below the first coil 2210 and the second coil 2220. Here, a charging bed for putting a wireless power reception apparatus thereon may be disposed above the first coil 2210 and the second coil 2220.

Each of the first coil 2210 and the second coil 2220 may be configured in such a way that a coil with a section including a conductive material and an insulating material surrounds the conductive material is wound. Two terminals A and B of the first coil 2210 may be conductibly connected to an inverter and a capacitor of the first resonance circuit, respectively, and two terminals C and D of the second coil 2220 may be conductibly connected to an inverter and a capacitor of the second resonance circuit, respectively.

As shown in FIG. 22, an external circumference of the first coil 2210 for transmitting low power may be smaller than an internal circumference of the second coil 2220 for transmitting high power, and the first coil 2210 may be disposed inside the second coil 2220.

This is because it is effective to arrange the second coil 2220 on a wider area since the second coil 2220 needs to transmit high power. The first coil 2210 and the second coil 2220 may be concentrically arranged, thereby minimizing interference therebetween due to transmission power.

The embodiments of the present disclosure can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy discs, optical data storage devices, etc. and the computer readable recording medium is also embodied in the form of a carrier wave (e.g., transmission through the Internet).

The computer readable recording medium can also be distributed over network coupled computer systems so that the computer readable code is stored and executed in a distributed fashion. Also, functional programs, codes, and code segments for accomplishing the embodiments of the present disclosure can be easily construed by programmers skilled in the art to which the embodiments of the present disclosure pertain.

Those skilled in the art will appreciate that the present disclosure may be carried out in other specific ways than those set forth herein without departing from the spirit and essential characteristics of the present disclosure.

It will be apparent to those skilled in the art that various modifications and variations can be made in the present disclosure without departing from the spirit or scope of the present disclosure. Thus, it is intended that the present disclosure cover the modifications and variations of the embodiment provided they come within the scope of the appended claims and their equivalents.

INDUSTRIAL APPLICABILITY

The present disclosure may be applied to a wireless charging field, in particular, to a wireless power transmission apparatus for wireless charging.

The invention claimed is:

1. A wireless power transmission apparatus comprising:
a first transmission coil configured to transmit low power;
a second transmission coil configured to transmit high power higher than the low power of the first transmission coil, the second transmission coil having an internal circumference that is larger than an external circumference of the first transmission coil, and the first transmission coil and the second transmission coil being concentrically arranged;
a direct current (DC) power converter configured to receive DC power and to output a first voltage and a second voltage higher than the first voltage;
an inverter connected between the DC power converter and the first and second transmission coils, the inverter being configured to operate as a half bridge inverter and a full bridge inverter, according to an operation mode of the wireless power transmission apparatus and a required power of a wireless power reception apparatus; and
a controller configured to:
in response to the operation mode being a ping mode, supply the first voltage to the inverter and control the inverter to operate as the half bridge inverter while activating the first transmission coil or the second transmission coil to output a ping signal regardless of the required power of the wireless power reception apparatus,
in response to the operation mode being a quality measurement mode, supply the first voltage to the inverter and control the inverter to operate as the half bride inverter while activating the first transmission coil or the second transmission coil for measuring a quality factor value regardless of the required power of the wireless power reception apparatus,
in response to the operation mode being a power transmission mode and the required power of the wireless power reception apparatus corresponding to the low power, supply the first voltage to the inverter and control the inverter to operate as the half bridge inverter or the full bridge inverter while activating the first transmission coil to transmit the low power, and
in response to the operation mode being the power transmission mode and the required power of the wireless power reception apparatus corresponding to the high power, supply the second voltage to the inverter and control the inverter to operate as the half bridge inverter or the full bridge inverter while activating the second transmission coil to transmit the high power.

2. The wireless power transmission apparatus of claim 1, wherein the controller is further configured to alternately select the first transmission coil and the second transmission coil for transmitting the ping signal while the operation mode is the ping mode.

3. The wireless power transmission apparatus of claim 1, wherein, when the wireless power reception apparatus makes a request for a first type of the low power, the controller operates the inverter as the half bridge inverter; and
wherein, when the wireless power reception apparatus makes a request for a second type of the low power higher than the first type of the low power, the controller operates the inverter as the full bridge inverter.

4. The wireless power transmission apparatus of claim 1, wherein, when the wireless power reception apparatus makes a request for a first type of the high power, the controller operates the inverter as the half bridge inverter; and
wherein, when the wireless power reception apparatus makes a request for a second type of high power higher than the first type of high power, the controller operates the inverter as the full bridge inverter.

5. A wireless power transmission apparatus comprising:
a first transmission coil configured to transmit low power;

a second transmission coil configured to transmit high power higher than the low power of the first transmission coil, the second transmission coil having an internal circumference that is larger than an external circumference of the first transmission coil;

a direct current (DC) power converter configured to receive DC power and to output a first voltage and a second voltage higher than the first voltage;

an inverter connected between the DC power converter and the first and second transmission coils, the inverter being configured to operate as a half bridge inverter and a full bridge inverter, according to an operation mode of the wireless power transmission apparatus and a required power of a wireless power reception apparatus; and a controller configured to:
  in response to the operation mode being a ping mode, supply the first voltage to the inverter and control the inverter to operate as the half bridge inverter while activating the first transmission coil or the second transmission coil to output a ping signal regardless of the required power of the wireless power reception apparatus,
  in response to the operation mode being a power transmission mode and the required power of the wireless power reception apparatus corresponding to the low power, supply the first voltage to the inverter and control the inverter to operate as the half bridge inverter or the full bridge inverter while activating the first transmission coil to transmit the low power, and
  in response to the operation mode being the power transmission mode and the required power of the wireless power reception apparatus corresponding to the high power, supply the second voltage to the inverter and control the inverter to operate as the half bridge inverter or the full bridge inverter while activating the second transmission coil to transmit the high power.

6. The wireless power transmission apparatus of claim 5, wherein the first transmission coil and the second transmission coil are concentrically arranged.

7. The wireless power transmission apparatus of claim 5, wherein the controller is further configured to:
  in response to the operation mode being a quality measurement mode, supply the first voltage to the inverter and control the inverter to operate as the half bridge inverter while activating the first transmission coil or the second transmission coil for measuring a quality factor value regardless of the required power of the wireless power reception apparatus.

8. The wireless power transmission apparatus of claim 5, wherein the controller is further configured to:
  alternately select the first transmission coil and the second transmission coil for transmitting the ping signal while the operation mode is the ping mode.

9. The wireless power transmission apparatus of claim 5, wherein the controller is further configured to:
  in response to the operation mode being the power transmission mode and the required power of the wireless power reception apparatus corresponding to a first type of the low power, supply the first voltage to the inverter and control the inverter to operate as the half bridge inverter while activating the first transmission coil to transmit the first type of the low power, and
  in response to the operation mode being the power transmission mode and the required power of the wireless power reception apparatus corresponding to a second type of the low power that is higher than the first type of the low power, supply the first voltage to the inverter and control the inverter to operate as the full bridge inverter while activating the first transmission coil to transmit the second type of the low power.

10. The wireless power transmission apparatus of claim 5, wherein the controller is further configured to:
  in response to the operation mode being the power transmission mode and the required power of the wireless power reception apparatus corresponding to a first type of the high power, supply the second voltage to the inverter and control the inverter to operate as the half bridge inverter while activating the second transmission coil to transmit the first type of the high power, and
  in response to the operation mode being the power transmission mode and the required power of the wireless power reception apparatus corresponding to a second type of the high power that is higher than the first type of the high power, supply the second voltage to the inverter and control the inverter to operate as the full bridge inverter while activating the second transmission coil to transmit the second type of the high power.

11. A wireless power transmission apparatus comprising:
a first transmission coil configured to transmit low power;
a second transmission coil configured to transmit high power higher than the low power of the first transmission coil, the second transmission coil having an internal circumference that is larger than an external circumference of the first transmission coil, and the first transmission coil and the second transmission coil being concentrically arranged;
a direct current (DC) power converter configured to receive DC power and to output a first voltage and a second voltage higher than the first voltage;
an inverter connected between the DC power converter and the first and second transmission coils, the inverter being configured to operate as a half bridge inverter and a full bridge inverter, according to an operation mode of the wireless power transmission apparatus and a required power of a wireless power reception apparatus; and
a controller configured to:
  in response to the operation mode being a ping mode, supply the first voltage to the inverter and control the inverter to operate as the half bridge inverter while activating the first transmission coil or the second transmission coil to output a ping signal regardless of the required power of the wireless power reception apparatus,
  in response to the operation mode being a quality measurement mode, supply the first voltage to the inverter and control the inverter to operate as the half bridge inverter while activating the first transmission coil or the second transmission coil for measuring a quality factor value regardless of the required power of the wireless power reception apparatus,
  in response to the operation mode being the power transmission mode and the required power of the wireless power reception apparatus corresponding to a first type of the low power, supply the first voltage to the inverter and control the inverter to operate as the half bridge inverter while activating the first transmission coil to transmit the first type of the low power, in response to the operation mode being the power transmission mode and the required power of the wireless power reception apparatus corresponding to a second type of the low power that is higher than the first type of the low power, supply the first voltage to the inverter and control the inverter to operate as the full bridge inverter while activating the first transmission coil to transmit the second type of the low power in response to the operation mode being the power transmission mode and the required power of the wireless power reception apparatus corresponding to a first type of the high power, supply the second voltage to the inverter and control the inverter to operate as the half bridge inverter while activating the second transmission coil to transmit the first type of the high power, and in response to the operation mode being the power transmission mode and the required power of the wireless power reception apparatus corresponding to a second type of the high power that is higher than the first type of the high power, supply the second voltage to the inverter and control the inverter to operate as the full bridge inverter while activating the second transmission coil to transmit the second type of the high power.

12. The wireless power transmission apparatus of claim 11, wherein the first type of the low power is less than the second type of the low power, the second type of the low power is less than the first type of the high power, and the first type of the high power is less than the second type of the high power.

* * * * *